(12) United States Patent
Shimizu

(10) Patent No.: US 11,370,459 B2
(45) Date of Patent: Jun. 28, 2022

(54) VEHICLE CONTROL SYSTEM

(71) Applicant: HONDA MOTOR CO., LTD., Tokyo (JP)

(72) Inventor: Yosuke Shimizu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 17/021,036

(22) Filed: Sep. 15, 2020

(65) Prior Publication Data

US 2021/0078607 A1    Mar. 18, 2021

(30) Foreign Application Priority Data

Sep. 17, 2019    (JP) .............................. JP2019-168729

(51) Int. Cl.
| | |
|---|---|
| B60W 60/00 | (2020.01) |
| B60W 40/08 | (2012.01) |
| B60W 50/14 | (2020.01) |
| G06V 20/59 | (2022.01) |
| G06V 40/10 | (2022.01) |

(52) U.S. Cl.
CPC ........ B60W 60/0053 (2020.02); B60W 40/08 (2013.01); B60W 50/14 (2013.01); G06V 20/59 (2022.01); G06V 40/107 (2022.01); B60W 2540/223 (2020.02)

(58) Field of Classification Search
None
See application file for complete search history.

(56) References Cited

U.S. PATENT DOCUMENTS

| | | | | |
|---|---|---|---|---|
| 2017/0106786 | A1* | 4/2017 | Ebina | B60Q 3/70 |
| 2017/0166237 | A1* | 6/2017 | Oh | B62D 1/28 |
| 2018/0105102 | A1* | 4/2018 | Ohashi | B60Q 3/745 |
| 2018/0105184 | A1 | 4/2018 | Urano et al. | |
| 2019/0025823 | A1* | 1/2019 | Christiansen | B62D 15/029 |
| 2019/0337566 | A1* | 11/2019 | Weidig | B60Q 3/283 |

FOREIGN PATENT DOCUMENTS

| | | | |
|---|---|---|---|
| JP | 5267234 B2 | * | 8/2013 |
| JP | 2018062321 A | | 4/2018 |

OTHER PUBLICATIONS

Espacenet translation of JP5267234B2 (Year: 2013).*

* cited by examiner

*Primary Examiner* — James J Lee
*Assistant Examiner* — Andrew Sang Kim
(74) *Attorney, Agent, or Firm* — Armstrong Teasdale LLP

(57) ABSTRACT

A vehicle control system includes: an operation element configured to receive a driving operation by an occupant; a movement sensor configured to detect a movement of the operation element; a travel control unit configured to select a manual driving mode to control a steering device based on a signal from the movement sensor or an autonomous driving mode to control the steering device regardless of the signal from the movement sensor; a travel information acquiring unit configured to acquire travel information of a vehicle; a grip area setting unit configured to set at least one recommended grip area of the operation element based on the travel information of the vehicle; an indicator configured to turn on so as to illuminate the recommended grip area; and an indicator control unit configured to change a control mode of the indicator according to a driving mode selected by the travel control unit.

12 Claims, 17 Drawing Sheets

Fig.8A
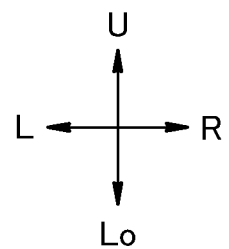
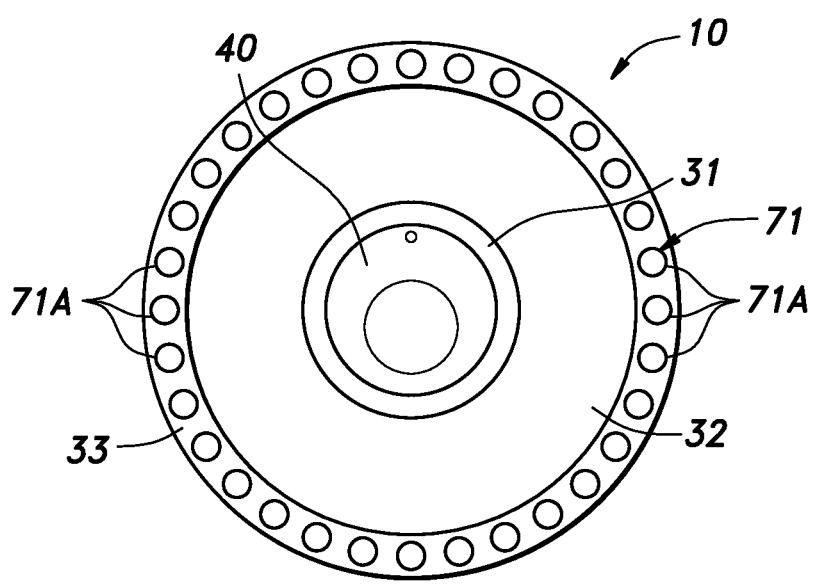

Fig.8C
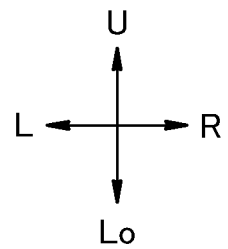
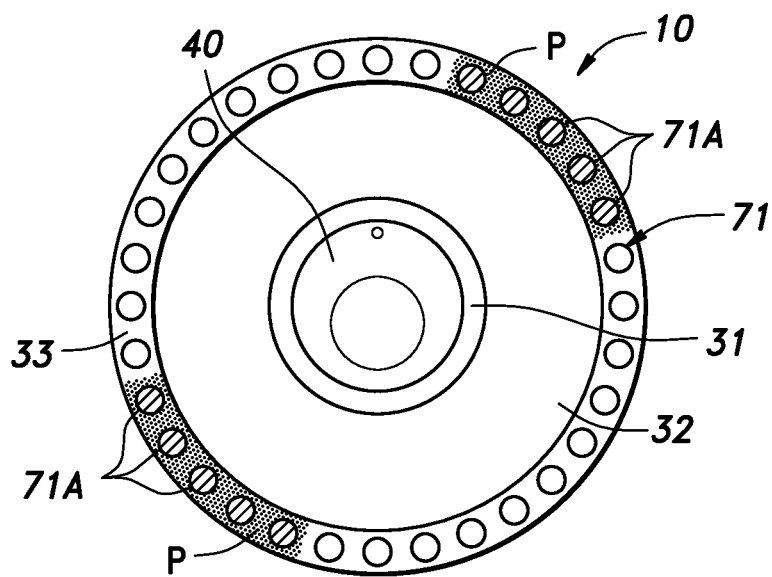

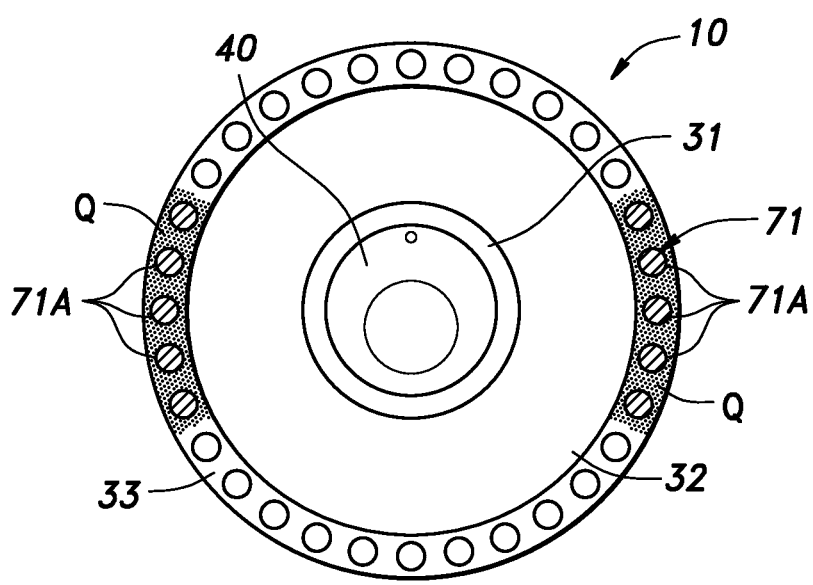
Fig.10A
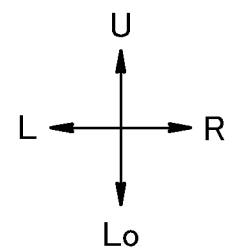

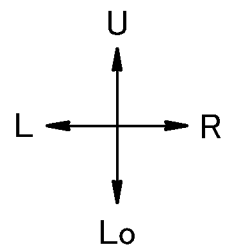
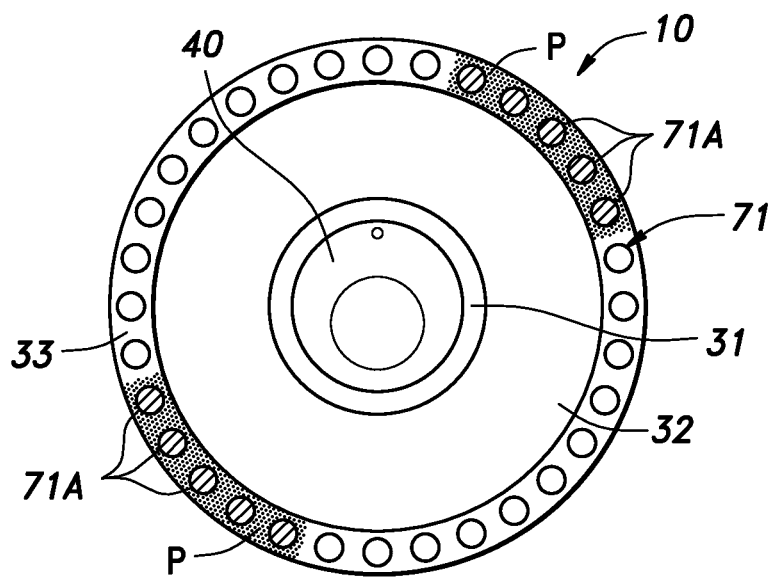
Fig.10B

Fig.12A
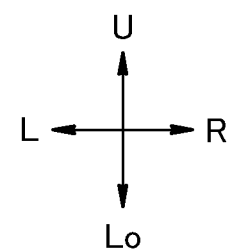
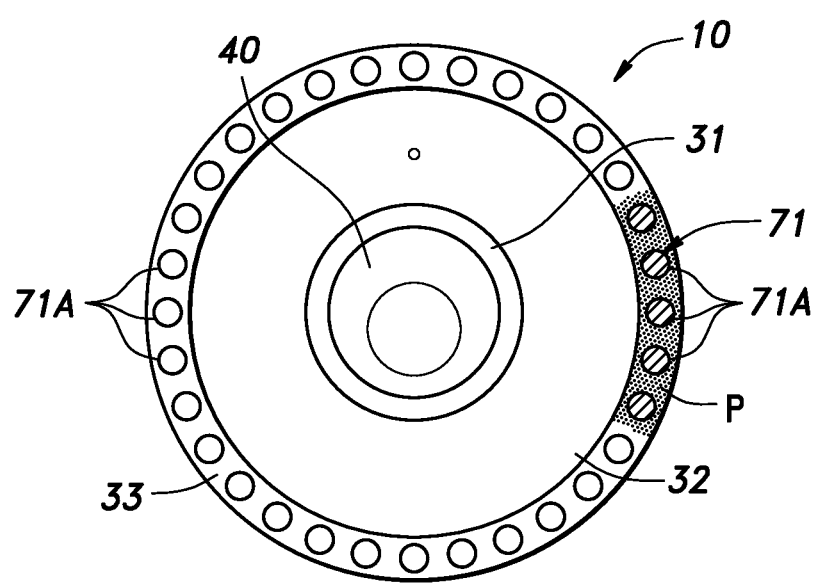

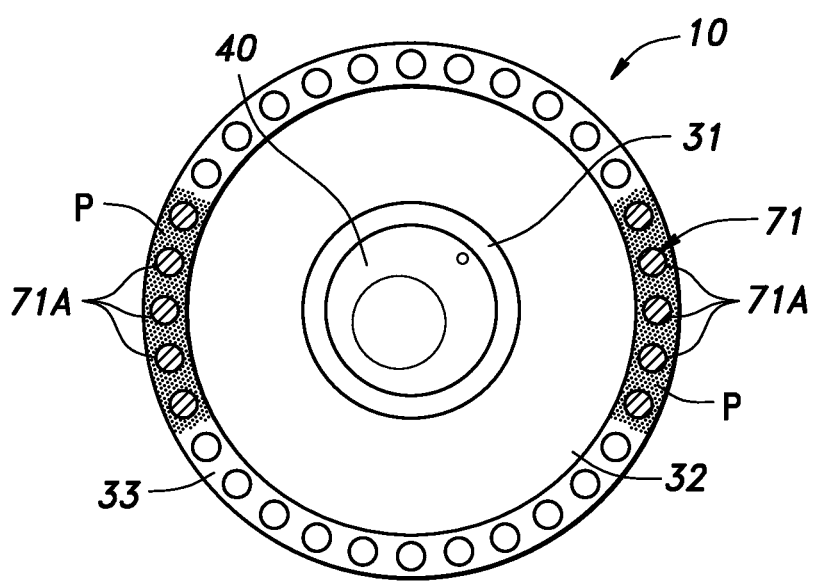
Fig.12B
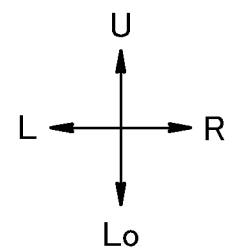

VEHICLE CONTROL SYSTEM

TECHNICAL FIELD

The present invention relates to a vehicle control system.

BACKGROUND ART

A vehicle control system known in the art can switch a driving mode of a vehicle between a manual driving mode and an autonomous driving mode (for example, JP2018-62321A). In the manual driving mode, the vehicle travels according to a driving operation on an operation element (for example, a steering wheel) by an occupant. On the other hand, in the autonomous driving mode, the vehicle automatically travels without the driving operation on the operation element by the occupant.

In the above vehicle control system, the occupant starts to grip the operation element when the driving mode of the vehicle is switched from the autonomous driving mode to the manual driving mode. At this time, if it is difficult for the occupant to find an area of the operation element to be gripped, the occupant may not be able to smoothly start the driving operation on the operation element.

SUMMARY OF THE INVENTION

In view of such a problem of the prior art, a primary object of the present invention is to provide a vehicle control system that enables the occupant to smoothly start the driving operation on the operation element by clearly indicating an area of the operation element to be gripped by the occupant.

To achieve such an object, one embodiment of the present invention provides a vehicle control system (1) including: a steering device (4) configured to change a steering angle of a wheel (3); an operation element (10) provided movably with respect to a vehicle body (15) and configured to receive a driving operation by an occupant (X); a movement sensor (38) configured to detect a movement of the operation element; a travel control unit (12) configured to select a manual driving mode to control the steering device based on a signal from the movement sensor or an autonomous driving mode to control the steering device regardless of the signal from the movement sensor; a travel information acquiring unit (72) configured to acquire travel information of a vehicle (2); a grip area setting unit (73) configured to set at least one recommended grip area (P) of the operation element based on the travel information of the vehicle acquired by the travel information acquiring unit; an indicator (71) configured to turn on so as to illuminate the recommended grip area set by the grip area setting unit; and an indicator control unit (41) configured to change a control mode of the indicator according to a driving mode selected by the travel control unit.

According to this arrangement, the indicator clearly indicates the recommended grip area to the occupant, so that the occupant can easily find an area of the operation element to be gripped by the occupant, and thus can smoothly start the driving operation on the operation element. Further, by changing the control mode of the indicator according to the driving mode, the indicator can be shifted to a state suitable for the driving mode.

In the above arrangement, preferably, the travel information acquiring unit is configured to acquire a prospective trajectory of the vehicle as the travel information of the vehicle, and the grip area setting unit is configured to set the recommended grip area based on the prospective trajectory of the vehicle acquired by the travel information acquiring unit.

According to this arrangement, the recommended grip area can be set according to the prospective trajectory of the vehicle, so that the occupant can start the driving operation on the operation element more smoothly.

In the above arrangement, preferably, the operation element includes an annular grip portion (33), the indicator includes plural light sources (71A) arranged annularly along the grip portion, and in a case where the prospective trajectory of the vehicle is a straight trajectory, the grip area setting unit sets the recommended grip area in a whole area of the grip portion in a circumferential direction, and all the plural light sources turn on.

According to this arrangement, in a case where the prospective trajectory of the vehicle is the straight trajectory, it is possible to clearly indicate that the occupant can grip any area of the operation element.

In the above arrangement, preferably, the operation element includes an annular grip portion, the indicator includes plural light sources arranged annularly along the grip portion, and in a case where the prospective trajectory of the vehicle is a turning trajectory, the grip area setting unit sets the recommended grip area in a part of the grip portion in a circumferential direction, and a part of the plural light sources turn on.

According to this arrangement, in a case where the prospective trajectory of the vehicle is the turning trajectory, it is possible to clearly indicate an area of the operation element to be gripped by the occupant.

In the above arrangement, preferably, when the vehicle is traveling on a turning trajectory, the grip area setting unit sets at least one proper grip area (Q) of the operation element at a point where the prospective trajectory of the vehicle changes from the turning trajectory to a straight trajectory, and sets the recommended grip area based on the proper grip area.

According to this arrangement, the recommended grip area can be set such that the occupant grips the proper grip area of the operation element when the prospective trajectory of the vehicle changes from the turning trajectory to the straight trajectory.

In the above arrangement, preferably, the at least one recommended grip area includes plural recommended grip areas, the travel information acquiring unit is configured to acquire a prospective deceleration of the vehicle within a prescribed time as the travel information of the vehicle, and in a case where the travel information acquiring unit acquires the prospective deceleration equal to or more than a prescribed threshold, the grip area setting unit sets the plural recommended grip areas at respective prescribed positions of both lateral parts of the operation element.

According to this arrangement, it is possible to prompt the occupant to grip appropriate areas of the operation element according to braking of the vehicle.

In the above arrangement, preferably, the travel information acquiring unit is configured to acquire the steering angle of the wheel as the travel information of the vehicle, and the grip area setting unit is configured to set the recommended grip area based on the steering angle of the wheel acquired by the travel information acquiring unit.

According to this arrangement, the recommended grip area can be set according to the steering angle of the wheel, so that the occupant can start the driving operation on the operation element more smoothly.

In the above arrangement, preferably, the vehicle control system further includes: an occupant detection unit (26, 35 to 37) configured to detect a driving state of the occupant; and a transmission ratio setting unit (75) configured to set a transmission ratio based on the driving state of the occupant detected by the occupant detection unit, the transmission ratio being a ratio of a control amount of the steering device to an operation amount of the operation element, wherein the grip area setting unit is configured to set the recommended grip area based on the travel information of the vehicle and the transmission ratio.

According to this arrangement, the recommended grip area can be set according to not only the travel information of the vehicle but also the transmission ratio, so that the occupant can start the driving operation on the operation element more smoothly.

In the above arrangement, preferably, the occupant detection unit includes a touch sensor (35 to 37) configured to detect contact of the occupant against the operation element, and the transmission ratio setting unit is configured to estimate a contact area of the operation element and the occupant based on a signal from the touch sensor and to set the transmission ratio based on the estimated contact area.

According to this arrangement, the transmission ratio can be appropriately set based on the contact area of the operation element and the occupant.

In the above arrangement, preferably, the occupant detection unit includes an image capturing device (26) configured to capture an image of the occupant, and the transmission ratio setting unit is configured to estimate a direction of a sight-line of the occupant based on the image of the occupant captured by the image capturing device and to set the transmission ratio based on the estimated direction of the sight-line.

According to this arrangement, the transmission ratio can be appropriately set based on the direction of the sight-line of the occupant.

In the above arrangement, preferably, the vehicle control system further includes: an image capturing device (26) configured to capture an image of at least one arm of the occupant and the operation element; and an approach determining unit (74) configured to determine whether the arm of the occupant has approached the operation element based on the image captured by the image capturing device, wherein in a case where the approach determining unit determines that the arm of the occupant has approached the operation element, the indicator turns on.

According to this arrangement, the indicator can be prevented from turning on unnecessarily, and the occupant can easily notice the recommended grip position.

In the above arrangement, preferably, the approach determining unit is configured to identify a number and a position of the at least one arm of the occupant that has approached the operation element based on the image captured by the image capturing device, and the grip area setting unit is configured to set the recommended grip area based on the number and the position of the arm of the occupant identified by the approach determining unit.

According to this arrangement, the recommended grip area is set according to the number and the position of the arm of the occupant that has approached the operation element, so that the occupant can more easily find an area of the operation element to be gripped, and thus can more smoothly start the driving operation on the operation element.

In the above arrangement, preferably, the vehicle control system further includes a grip sensor (35 to 37) configured to detect that the operation element is gripped by the occupant, wherein in a case where the grip sensor does not detect that the recommended grip area is gripped by the occupant after the indicator turns on, the indicator stays on for a prescribed period, and in a case where the grip sensor detects that the recommended grip area is gripped by the occupant after the indicator turns on, the indicator turns off.

According to this arrangement, in a case where the occupant does not grip the recommended grip area, the indicator stays on for the prescribed period, thereby prompting the occupant to grip the recommended grip area. On the other hand, in a case where the occupant grips the recommended grip area, the indicator turns off, thereby preventing the indicator from turning on unnecessarily.

In the above arrangement, preferably, in a state where the travel control unit selects the manual driving mode, the indicator control unit selects a first control mode in which the indicator stays off, and in a state where the travel control unit selects the autonomous driving mode, the indicator control unit selects a second control mode in which the indicator at least temporarily stays on.

According to this arrangement, in a state where the travel control unit selects the manual driving mode, the indicator stays off, thereby preventing the indicator from turning on unnecessarily. On the other hand, in a state where the travel control unit selects the autonomous driving mode, the indicator clearly indicates the recommended grip area to the occupant, so that the occupant can easily find an area of the operation element to be gripped by the occupant.

Thus, according to the above arrangements, it is possible to provide a vehicle control system that enables the occupant to smoothly start the driving operation on the operation element by clearly indicating an area of the operation element to be gripped by the occupant.

BRIEF DESCRIPTION OF THE DRAWINGS

FIG. 8A is a rear view showing a first example of a lighting control of an indicator having a plurality of light sources, the light sources being off.

FIG. 8B is a rear view similar to FIG. 8A but with the light sources being on.

FIG. 8C is a rear view similar to FIGS. 8A and 8B but with some of the light sources being on and some of the light sources being off.

FIG. 10A is a rear view showing the second example of the lighting control of the indicator with some of the light sources being on and some of the light sources being off;

FIG. 10B is a rear view similar to FIG. 10B but with different ones of the light sources being on and off;

FIG. 12A is a rear view showing a fourth example of the lighting control of the indicator with some of the light sources being on and some of the light sources being off;

FIG. 12B is a rear view similar to FIG. 12A with different ones of the light sources being on and off.

DESCRIPTION OF THE PREFERRED EMBODIMENT(S)

In the following, an embodiment of a vehicle control system 1 according to the present invention will be described with reference to the drawings. Arrows Fr, Re, L, R, U, and Lo, which are appropriately attached to FIG. 2 and subsequent drawings, respectively indicate a front side, a rear side, a left side, a right side, an upper side, and a lower side of a vehicle 2 in which the vehicle control system 1 is provided. In the present embodiment, the lateral direction is defined as the vehicle width direction of the vehicle 2, and the fore and aft direction is defined as the vehicle length direction of the vehicle 2.

<The Configuration of the Vehicle Control System 1>

Figure 1:
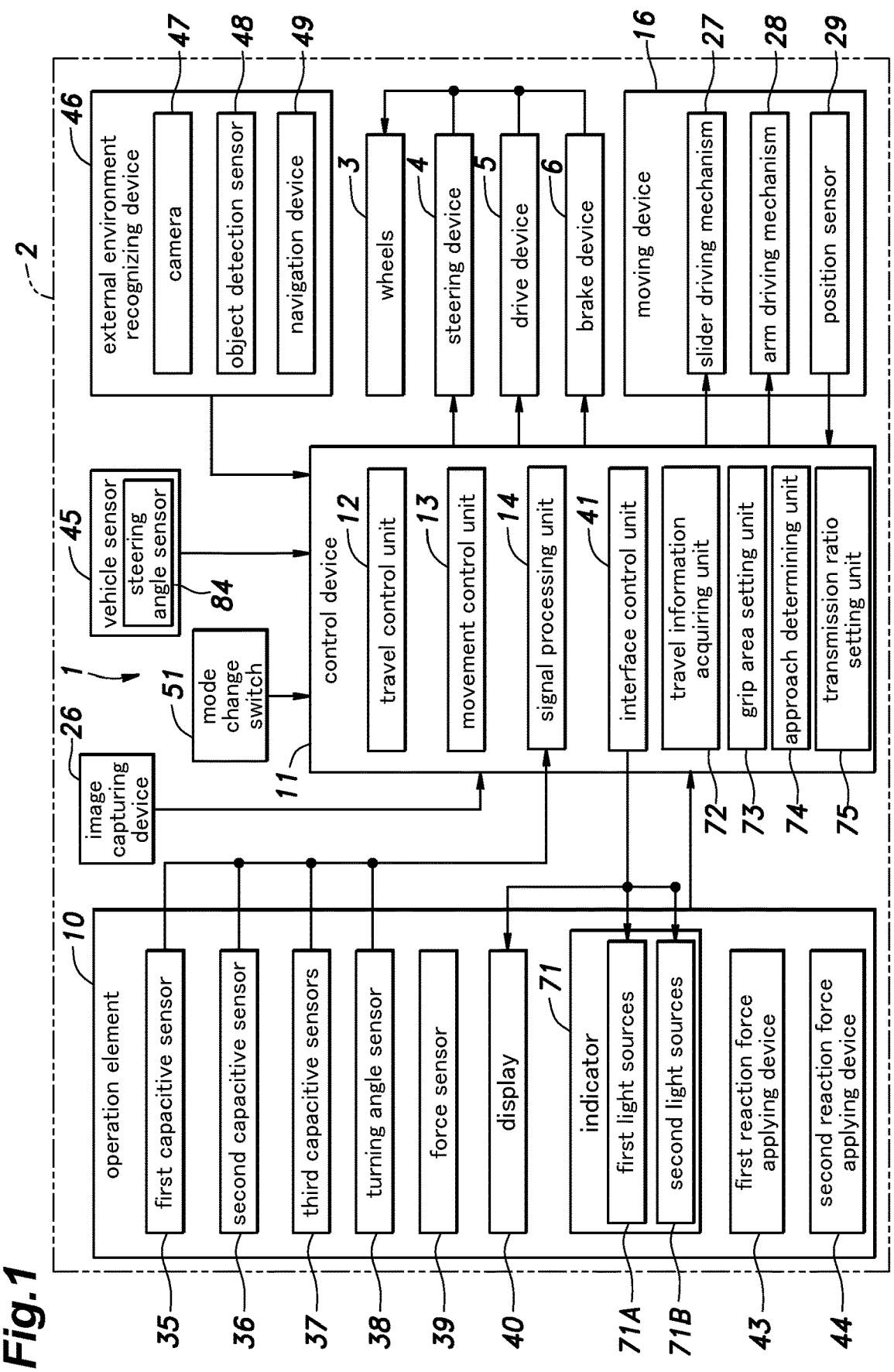
FIG. 1 is a block diagram of a vehicle control system according to an embodiment of the present invention.

As shown in FIG. 1, the vehicle control system 1 is provided in a vehicle 2 which is capable of autonomous driving. The vehicle 2 can travel either in a manual driving mode in which an occupant X mainly performs a driving operation or in an autonomous driving mode in which the vehicle 2 (more specifically, an undermentioned control device 11) mainly performs the driving operation. The vehicle 2 includes a steering device 4 configured to steer wheels 3 of the vehicle 2, a drive device 5 configured to rotate the wheels 3, and a brake device 6 configured to apply the brakes to the wheels 3.

The steering device 4 is a device configured to change a steering angle of the wheels 3, and includes an electric motor and a steering mechanism configured to steer the wheels 3 by a driving force of the electric motor. The steering mechanism includes, for example, a rack-and-pinion mechanism. The drive device 5 is a device configured to rotate the wheels 3, and includes at least one of an electric motor and an internal combustion engine. The drive device 5 further includes a transmission mechanism configured to transmit a driving force of the at least one of the electric motor and the internal combustion engine to the wheels 3. If the drive device 5 includes the internal combustion engine, the drive device 5 can apply the brakes to the wheels 3 by engine braking. If the drive device 5 includes the electric motor, the drive device 5 can apply the brakes to the wheels 3 by regenerative braking. The brake device 6 is a device configured to apply resistance to the wheels 3 and thus stop the rotation of the wheels 3. The brake device 6 includes an electric motor, a hydraulic pressure generating device configured to generate hydraulic pressure as the electric motor is driven, and a brake caliper that presses a brake pad against a brake rotor on receiving the hydraulic pressure from the hydraulic pressure generating device.

The vehicle control system 1 includes an operation element 10 provided with various sensors and a control device 11 connected to the operation element 10. The operation element 10 is a device configured to receive a driving operation by the occupant X to steer the vehicle 2. The operation element 10 may include, for example, a steering wheel or a control stick. An outline of the operation element 10 may be formed in a shape such as a circular shape, a rectangular shape, a shape formed by cutting off a part of a circle, or a shape formed by combining left and right arc parts and upper and lower straight-line parts. The control device 11 includes a hardware processor such as a CPU. The control device 11 includes a travel control unit 12, a movement control unit 13, and a signal processing unit 14. The signal processing unit 14 is configured to detect an operation input by the occupant X based on a signal from the operation element 10, and the travel control unit 12 is configured to control at least one of the steering device 4, the drive device 5, and the brake device 6 according to the operation input detected by the signal processing unit 14. The movement control unit 13 is configured to control the movement of the operation element 10 according to the operation input detected by the signal processing unit 14.

Figure 2:
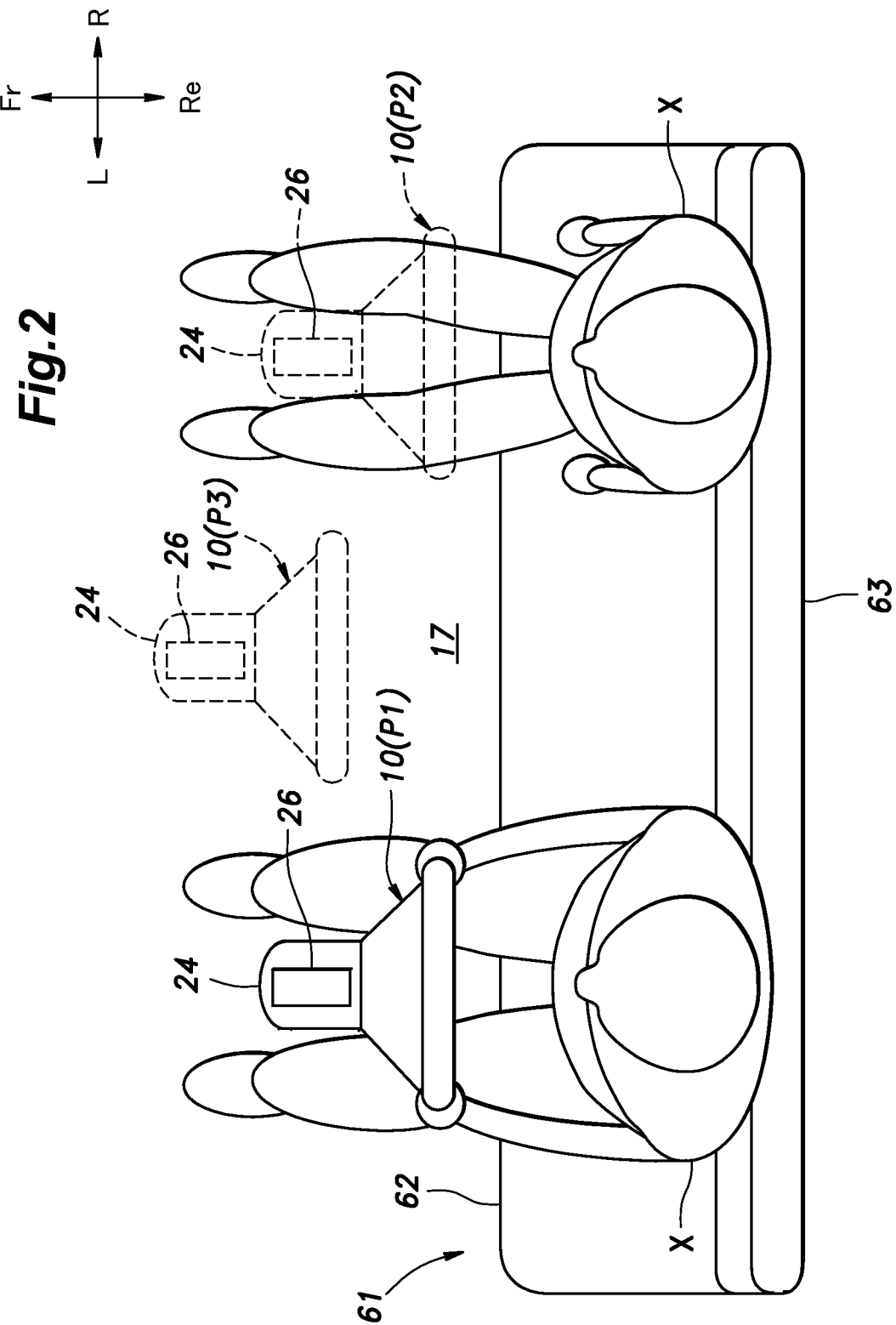
FIG. 2 is a plan view of a front part of a vehicle.
Figure 3:
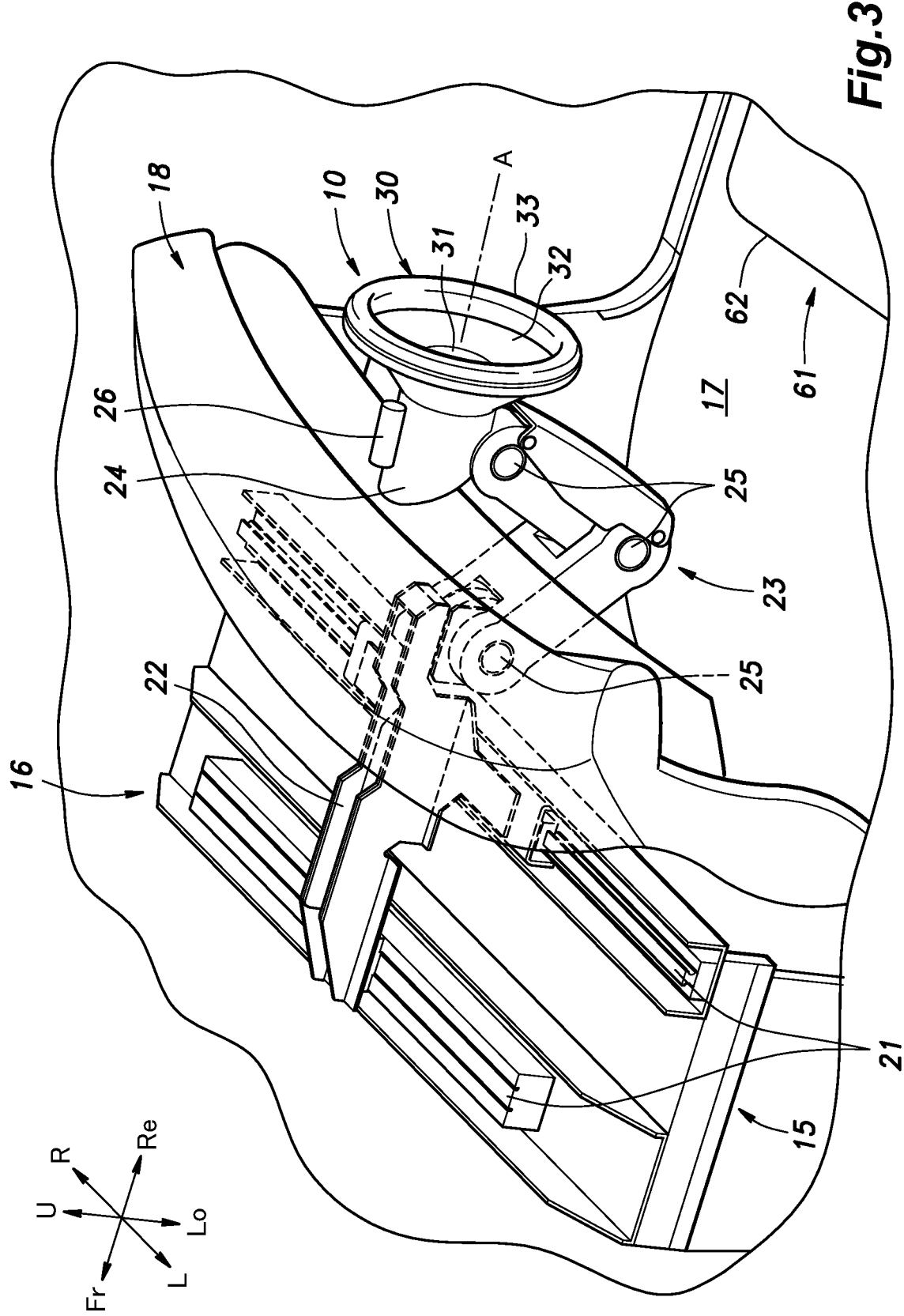
FIG. 3 is a perspective view of the front part of the vehicle.

As shown in FIGS. 2 and 3, a vehicle cabin 17 of the vehicle 2 is provided with an occupant seat 61 on which at least one occupant X (two occupants X are shown in FIG. 2) that performs the driving operation on the operation element 10 is seated. The occupant seat 61 is, for example, a bench seat having a seating space for plural persons, and extends along the lateral direction. By using such a bench seat as the occupant seat 61 in this way, a degree of flexibility in the seating position of the occupant X in the lateral direction can be increased. The occupant seat 61 is attached to a front part of a vehicle body 15 of the vehicle 2 via a base member (not shown). The occupant seat 61 includes a seat cushion 62 on which the occupant X is seated and a seat back 63 provided adjacently to the seat cushion 62 on an upper rear side thereof so as to support the occupant X from a rear side. The seat cushion 62 and the seat back 63 each have a prescribed width in the lateral direction (for example, a width for plural occupants X).

Figure 4:
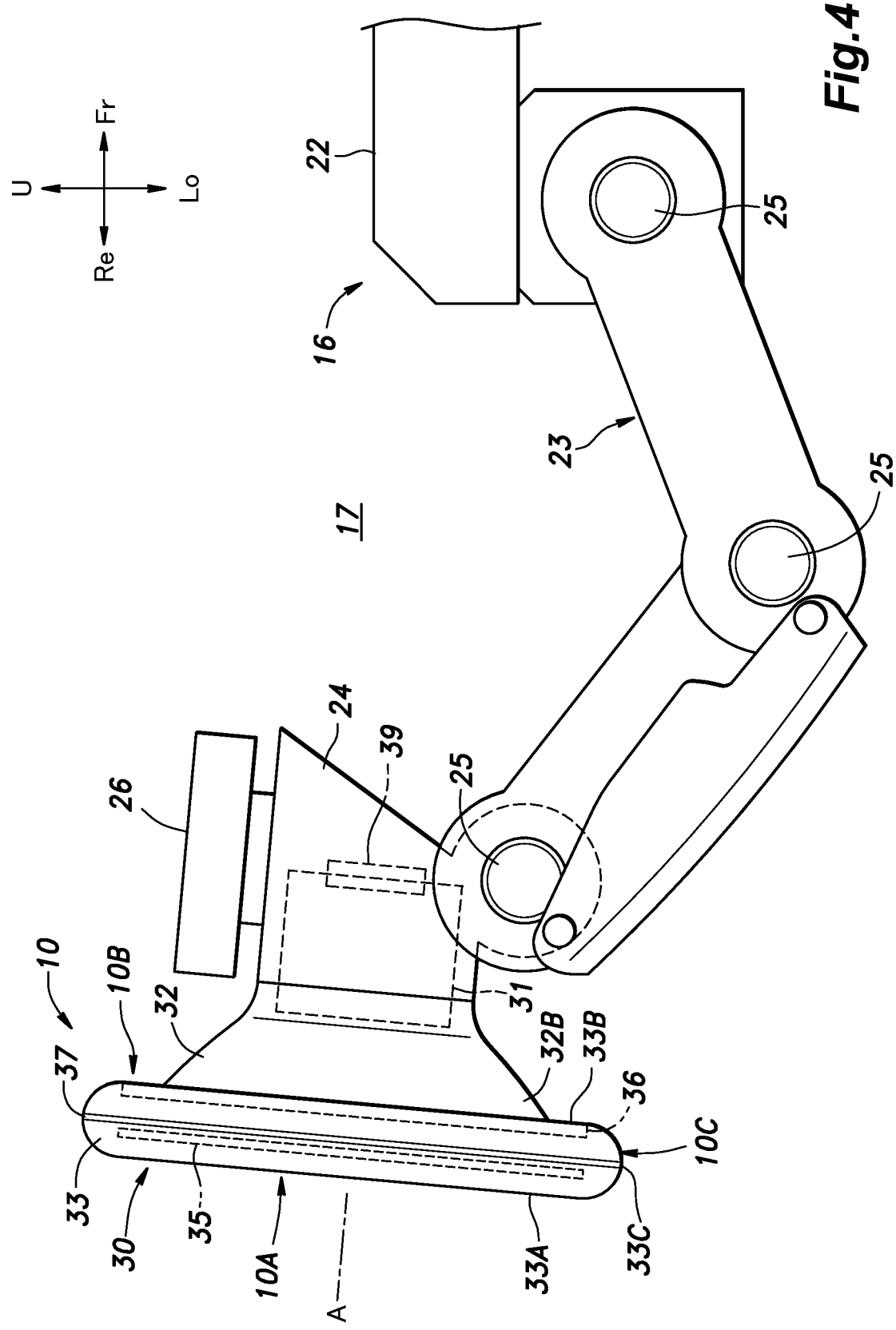
FIG. 4 is a side view of an operation element and a moving device.

As shown in FIGS. 3 and 4, the operation element 10 is supported by the front part of the vehicle body 15 via a moving device 16. The moving device 16 includes a pair of front and rear rails 21 provided on the front part of the vehicle body 15 and extending in the lateral direction, a slider 22 extending in the fore and aft direction so as to be provided between the pair of front and rear rails 21, an arm 23 extending rearward from the slider 22, and a base 24 provided at a rear end of the arm 23 and attached to the operation element 10.

The pair of front and rear rails 21 support the slider 22 such that the slider 22 is movable in the lateral direction. The pair of front and rear rails 21 and the slider 22 are provided in front of an instrument panel 18 that forms a front wall of the vehicle cabin 17 of the vehicle 2. Accordingly, the pair of front and rear rails 21 and the slider 22 are invisible or hardly seen from the occupant X in the vehicle cabin 17 of the vehicle 2, so that the design of the vehicle 2 is improved.

The arm 23 includes joints 25, and passes below the instrument panel 18 in a state where the joints 25 are bent such that the arm 23 protrudes downward. The arm 23 is stretchable in the fore and aft direction, and thereby supporting the base 24 such that the base 24 is movable in the fore and aft direction with respect to the slider 22.

An image capturing device 26 configured to capture an image of a space above the seat cushion 62 is provided on an upper surface of the base 24. The image capturing device 26 is positioned in front of the operation element 10 so as to be adjacent to the operation element 10.

As shown in FIG. 1, the moving device 16 includes a slider driving mechanism 27 and an arm driving mechanism 28. The slider driving mechanism 27 is configured to move the slider 22 in the lateral direction with respect to the rails 21 by an electric motor. Thereby, the slider 22, the arm 23, the base 24, and the operation element 10 move in the lateral direction with respect to the vehicle body 15. The arm driving mechanism 28 is configured to change a stretching degree of the arm 23 in the fore and aft direction by bending the joints 25 with an electric motor. Thereby, the base 24 and the operation element 10 move in the fore and aft direction with respect to the vehicle body 15. As described above, the moving device 16 is configured to move the operation element 10 in the lateral direction and the fore and aft direction with respect to the vehicle body 15.

The moving device 16 further includes a position sensor 29 configured to detect a position of the operation element 10 in the fore and aft direction. For example, the position sensor 29 is attached to the electric motor that forms the arm driving mechanism 28, or to one of the joints 25 of the arm 23. The position sensor 29 may be, for example, a potentiometer or a rotary encoder.

Figure 5:
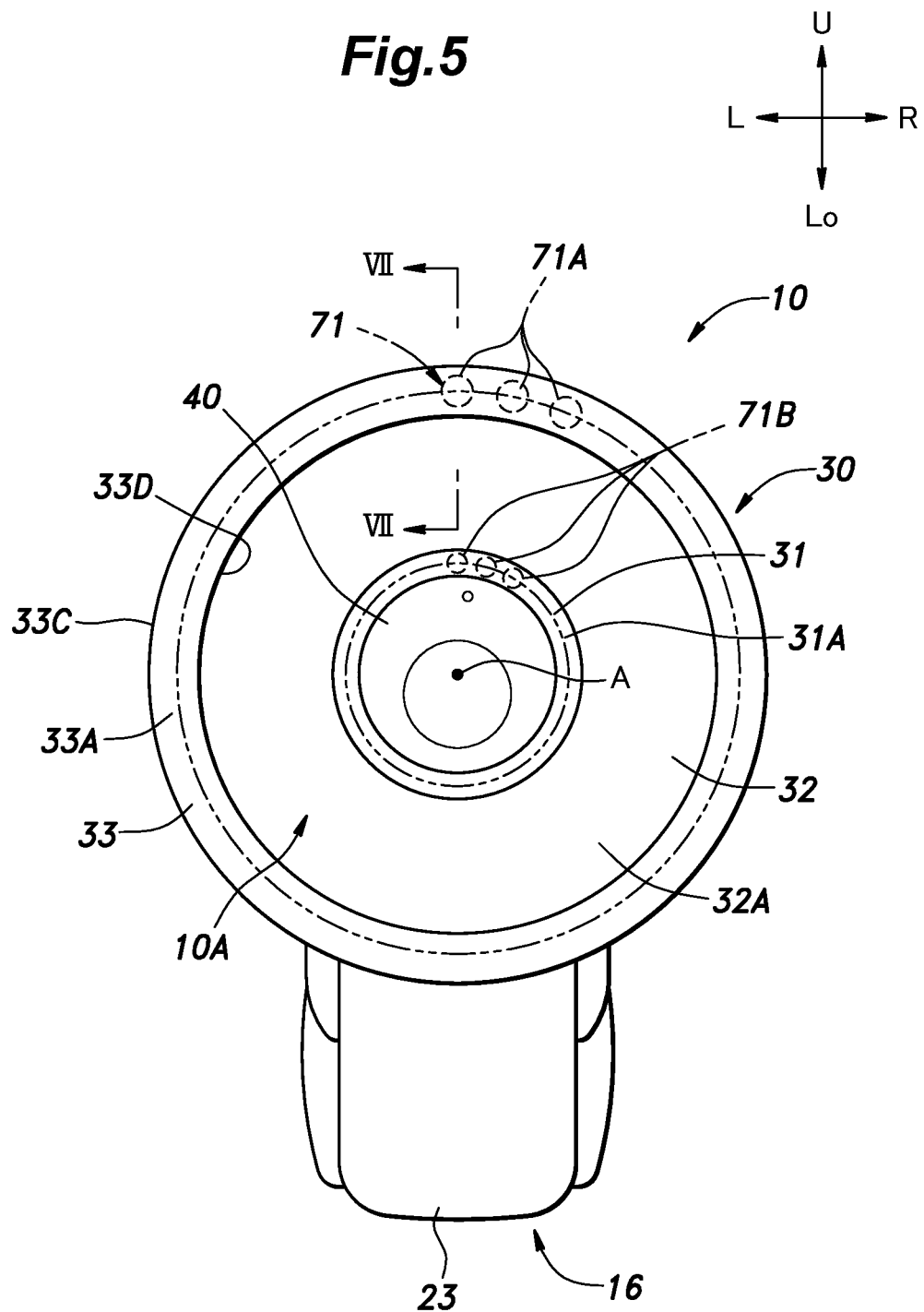
FIG. 5 is a rear view of the operation element and the moving device.

As shown in FIGS. 3 to 5, the operation element 10 includes a hub 31 provided rotatably on the base 24, a disk 32 (a spoke) provided coaxially with the hub 31 on an outer circumference of the hub 31, and a ring 33 provided on an outer circumference of the disk 32. The disk 32 is formed in a circular plate shape. In the present embodiment, the disk 32 extends radially outward from the hub 31 to a side opposite to the base 24 in a direction of a turning axis A of the operation element 10 (the hub 31), and is formed in a cone shape with the hub 31 on the top thereof. The ring 33 is formed in an annular shape around the turning axis A of the operation element 10 (the hub 31), and has a circular cross section. The cross-sectional diameter of the ring 33 is larger than the thickness of the disk 32. The ring 33 functions as a grip portion gripped by the occupant X to perform a turning operation on the operation element 10.

The hub 31 includes a facing part 31A facing a side of the occupant X and a back part (not shown) opposite to the facing part 31A. The disk 32 includes a facing part 32A facing the side of the occupant X and a back part 32B opposite to the facing part 32A. The ring 33 includes a facing part 33A facing the side of the occupant X, a back part 33B opposite to the facing part 33A, an outer circumferential part 33C provided on outer circumferences of the facing part 33A and the back part 33B, and an inner circumferential part 33D provided on inner circumferences of the facing part 33A and the back part 33B. More specifically, when the ring 33 is divided into two parts with a plane including an outer circumferential edge of the ring 33 (a part where the ring 33 has a maximum diameter around the turning axis A of the operation element 10) and an inner circumferential edge of the ring 33 (a part where the ring 33 has a minimum diameter around the turning axis A of the operation element 10), a part arranged on a side of the base 24 is defined as the back part 33B, while a part arranged on a side opposite to the base 24 is defined as the facing part 33A.

The operation element 10 includes a first surface part 10A, a second surface part 10B opposite to the first surface part 10A, and an outer circumferential part 10C provided on outer circumferences of the first surface part 10A and the second surface part 10B. The first surface part 10A is provided on one side along the turning axis A of the operation element 10, and forms a rear surface (one surface in the fore and aft direction) of the operation element 10. The second surface part 10B is provided on the other side along the turning axis A of the operation element 10, and forms a front surface (the other surface in the fore and aft direction) of the operation element 10. The first surface part 10A includes the facing part 31A of the hub 31, the facing part 32A of the disk 32, and the facing part 33A of the ring 33.

The second surface part 10B includes the back part 32B of the disk 32 and the back part 33B of the ring 33. The outer circumferential part 10C includes the outer circumferential part 33C of the ring 33. In another embodiment, the first surface part 10A may include the back part 32B of the disk 32 and the back part 33B of the ring 33, and the second surface part 10B may include the facing part 31A of the hub 31, the facing part 32A of the disk 32, and the facing part 33A of the ring 33.

As shown in FIG. 1, the operation element 10 is provided with a first capacitive sensor 35, a second capacitive sensor 36, and third capacitive sensors 37, which function as touch sensors (contact sensors). The operation element 10 is also provided with a turning angle sensor 38 and a force sensor 39. The turning angle sensor 38 is configured to detect a turning angle of the operation element 10 with respect to the vehicle body 15. The turning angle sensor 38 may be a rotary encoder, a resolver, or the like. In another embodiment, the operation element 10 may be provided with a gyro sensor configured to detect the turning speed of the operation element 10.

The force sensor 39 may be a known piezoelectric sensor or a known strain gauge sensor, and is provided between the base 24 and the hub 31. The force sensor 39 is, for example, a six-axis force sensor configured to detect the loads applied to the operation element 10 to the front side along the turning axis A (one side in the fore and aft direction), to the rear side along the turning axis A (the other side in the fore and aft direction), to the left side (the first side in the lateral direction), to the right side (the second side in the lateral direction), to the upper side along a direction orthogonal to the turning axis A (one side in the up-and-down direction), and to the lower side along the direction orthogonal to the turning axis A (the other side in the up-and-down direction).

Figure 6:
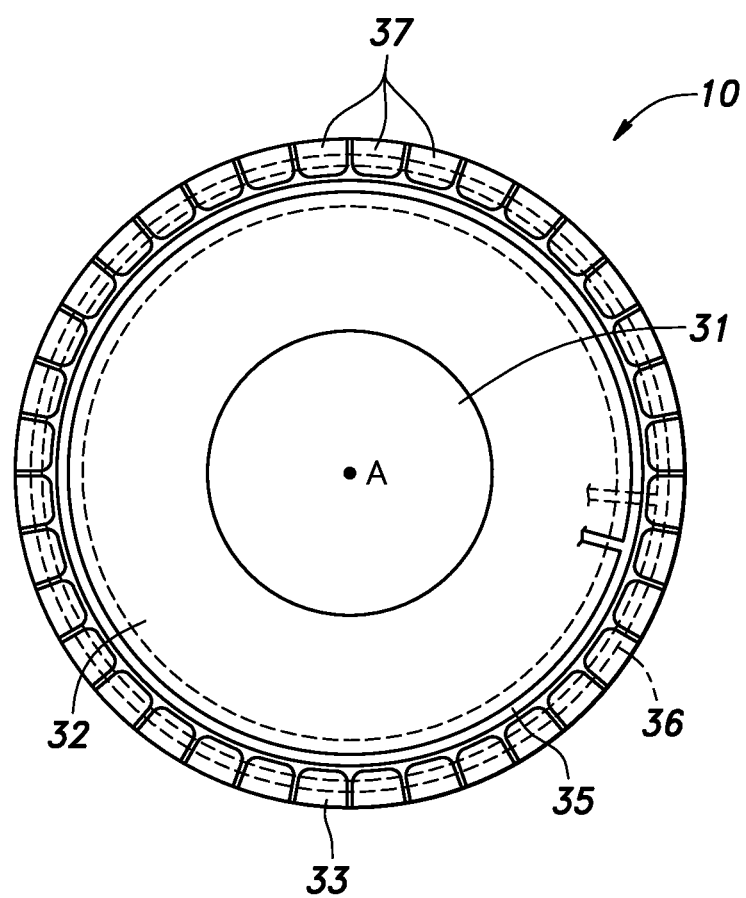
FIG. 6 is an explanatory diagram showing a positional relationship among first to third capacitive sensors provided in the operation element.
Figure 7:
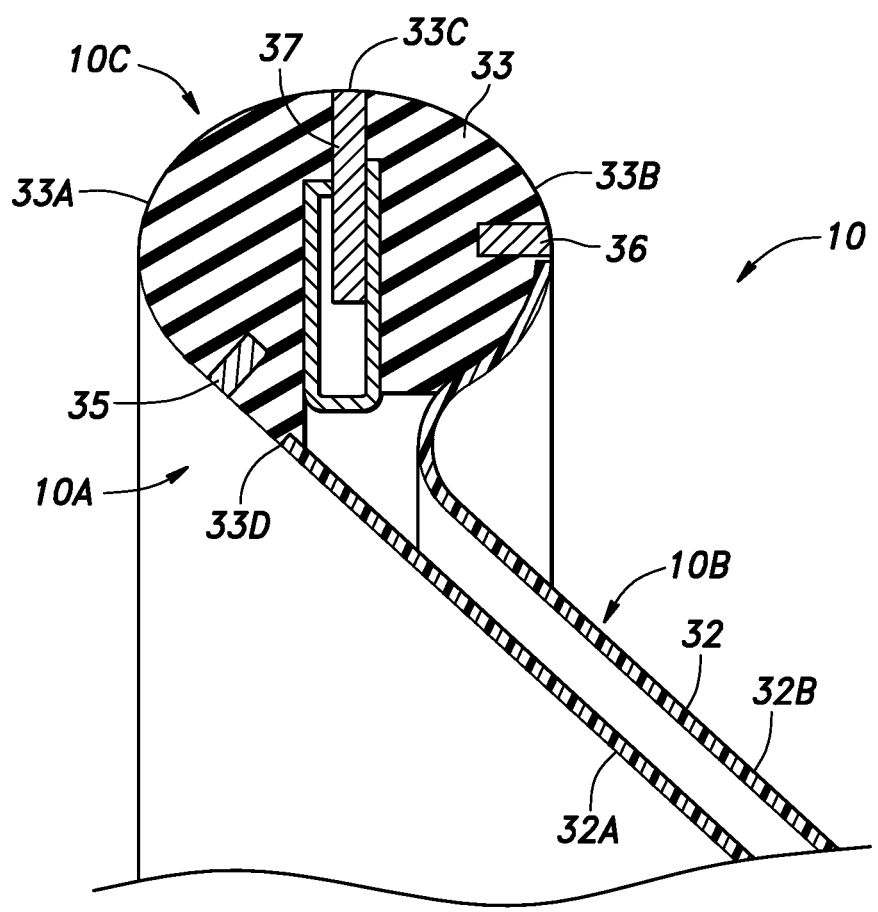
FIG. 7 is a sectional view of the operation element taken along a line VII-VII of FIG. 5.

As shown in FIGS. 4, 6, and 7, the first to third capacitive sensors 35 to 37 are touch sensors configured to detect approach and contact of an object such as the occupant X's hand (finger) according to a change in capacitance. The first to third capacitive sensors 35 to 37 are provided on the ring 33 of the operation element 10.

The first capacitive sensor 35 is provided on the first surface part 10A of the operation element 10, the second capacitive sensor 36 is provided on the second surface part 10B of the operation element 10, and the third capacitive sensors 37 are provided on the outer circumferential part 10C of the operation element 10. More specifically, the first capacitive sensor 35 is provided on the facing part 33A of the ring 33, the second capacitive sensor 36 is provided on the back part 33B of the ring 33, and the third capacitive sensors 37 are provided on the outer circumferential part 33C of the ring 33. In another embodiment, the first capacitive sensor 35 may be provided on the back part 33B of the ring 33, and the second capacitive sensor 36 may be provided on the facing part 33A of the ring 33.

The first capacitive sensor 35 is a single sensor formed in an annular shape and provided coaxially with the ring 33 along the facing part 33A of the ring 33. In another embodiment, plural first capacitive sensors 35 may be arranged in the circumferential direction along the facing part 33A of the ring 33. The first capacitive sensor 35 is preferably provided on an inner circumferential side of the facing part 33A. More specifically, when viewed in the direction along the turning axis A of the operation element 10, the first capacitive sensor 35 is preferably provided on a radially inner side with respect to a center circle that passes through a widthwise central part of the ring 33. Namely, the first capacitive sensor 35 is preferably provided on the inner circumferential part 33D of the ring 33.

The second capacitive sensor 36 is a single sensor formed in an annular shape and provided coaxially with the ring 33 along the back part 33B of the ring 33. In another embodiment, plural second capacitive sensors 36 may be arranged in the circumferential direction along the back part 33B of the ring 33. The second capacitive sensor 36 preferably extends along a widthwise central part of the back part 33B. The second capacitive sensor 36 preferably has a larger diameter than the first capacitive sensor 35.

The third capacitive sensors 37 are provided along an outer edge of the operation element 10 and configured to identify a contact position of the hand of the occupant X (a position of a contact operation by the occupant X). In another embodiment, a single third capacitive sensor 37 may extend along the outer edge of the operation element 10, or plural third capacitive sensors 37 may be divided along the outer edge of the operation element 10. In the present embodiment, the third capacitive sensors 37 are arranged in the circumferential direction along the outer circumferential part 33C of the ring 33, which includes the outer circumferential edge of the ring 33. The third capacitive sensors 37 each have the same angular length in the circumferential direction, and are arranged adjacently to each other at equal intervals. Preferably, the gaps between the adjacent third capacitive sensors 37 are as small as possible. In the present embodiment, thirty-six third capacitive sensors 37 each having an angular length of about 10 degrees are provided.

The first to third capacitive sensors 35 to 37 are configured to output signals corresponding to the capacitance thereof. The capacitance of the first to third capacitive sensors 35 to 37 increases as the object such as the occupant X's hand approaches the respective sensors 35 to 37, as the size of the approaching object increases, and as the relative permittivity of the approaching object increases.

The first to third capacitive sensors 35 to 37 function as grip sensors configured to detect that the operation element 10 is gripped by the occupant X. For example, the first to third capacitive sensors 35 to 37 detect that the operation element 10 is gripped by the occupant X if the capacitance of at least one of the first capacitive sensor 35 and the second capacitive sensor 36 has increased to a prescribed reference value or more and the capacitance of the third capacitive sensors 37 equal to or more than a prescribed number has increased to the prescribed reference value or more. In another embodiment, the first to third capacitive sensors 35 to 37 may be configured to detect that the operation element 10 is gripped by the occupant X according to a detecting method different from the above method.

As shown in FIG. 5, a display 40 as a display unit is provided on the facing part 31A of the hub 31 (a side of the occupant X of the hub 31). The display 40 is formed in a circular shape and occupies 50% or more of the area of the facing part 31A of the hub 31. As shown in FIG. 1, the display 40 is configured to be controlled by an interface control unit 41 of the control device 11, thereby displaying images indicating a driving mode (the autonomous driving mode or the manual driving mode) of the vehicle 2, a travel direction (a future trajectory) of the vehicle 2, the position of a surrounding vehicle traveling around the vehicle 2, the speed of the vehicle 2, or the like. The images displayed on the display 40 may include numerical values and symbols.

A first reaction force applying device 43 (see FIG. 1) configured to apply a reaction force (turning resistance) to the turning (or the turning operation) of the operation element 10 with respect to the vehicle body 15 is provided between the vehicle body 15 and the operation element 10. The first reaction force applying device 43 is, for example, an electric motor, and configured to apply a rotational force of the electric motor to the operation element 10 as the reaction force to the turning of the operation element 10. In the present embodiment, the first reaction force applying device 43 is provided in the base 24, and configured to apply the reaction force to the turning of the hub 31 with respect to the base 24. The first reaction force applying device 43 can restrict the turning of the operation element 10 by applying sufficient turning resistance to the operation element 10. Namely, the first reaction force applying device 43 functions as a turning restriction device configured to restrict the turning of the operation element 10 with respect to the vehicle body 15.

A second reaction force applying device 44 (see FIG. 1) configured to apply a reaction force (movement resistance) to the movement (or the moving operation) of the operation element 10 along the turning axis A with respect to the vehicle body 15 is provided between the vehicle body 15 and the operation element 10. The second reaction force applying device 44 is, for example, the electric motor that forms the arm driving mechanism 28, and configured to apply a rotational force of the electric motor to the operation element 10 as the reaction force to the movement of the operation element 10 in the fore and aft direction. The second reaction force applying device 44 can restrict the movement of the operation element 10 in the fore and aft direction by applying sufficient movement resistance to the operation element 10. Namely, the second reaction force applying device 44 functions as a movement restriction device configured to restrict the movement of the operation element 10 in the fore and aft direction with respect to the vehicle body 15.

As shown in FIG. 1, the control device 11 is connected to a vehicle sensor 45 configured to detect various state quantities of the vehicle 2 and an external environment recognizing device 46 configured to detect environmental information around the vehicle 2. The vehicle sensor 45 includes, for example, a vehicle speed sensor configured to detect the speed of the vehicle 2, an acceleration sensor configured to detect the acceleration of the vehicle 2, and a yaw rate sensor configured to detect the yaw rate of the vehicle 2. The control device 11 is configured to acquire the various state quantities of the vehicle 2 from the vehicle sensor 45.

The external environment recognizing device 46 is configured to acquire surrounding vehicle information and surrounding environment information, thereby outputting the surrounding vehicle information and the surrounding environment information to the control device 11. The external environment recognizing device 46 includes a camera 47 configured to capture an image around the vehicle 2, an object detection sensor 48 such as a laser or a lidar configured to detect an object present around the vehicle 2, and a navigation device 49. The external environment recognizing device 46 is configured to identify lanes (travel trajectories) and lane markings based on the image captured by the camera 47. Also, the external environment recognizing device 46 is configured to acquire the surrounding vehicle information, which includes information about the position and the speed of the surrounding vehicle traveling around the vehicle 2, based on the image captured by the camera 47 and a detection signal of the object detection sensor 48. Also, the external environment recognizing device 46 is configured to acquire the surrounding environment information, which includes information about a first travel path where the vehicle is traveling, a second travel path adjacent to the first travel path, stores around the vehicle 2, and branch roads around the vehicle 2, based on the position of the vehicle 2 (namely, the own vehicle), map information, and Point of Interest (POI) acquired by the navigation device 49.

<The Driving Operation on the Operation Element 10>

The operation element 10 is configured to receive a first driving operation and a second driving operation as the driving operation. The first driving operation and the second driving operation each include an acceleration/deceleration operation and a steering operation different from each other. The first driving operation is a driving operation performed by touching the operation element 10 (for example, a single tap operation, a double tap operation, a long press operation, and a stroke operation). Accordingly, the movable amount of the operation element 10 according to the first driving operation is zero or extremely small. The second driving operation is a driving operation performed by turning or moving the operation element 10. Accordingly, the movable amount of the operation element 10 according to the second driving operation is larger than that of the operation element 10 according to the first driving operation. In this way, the first driving operation is a contact operation on the operation element 10, while the second driving operation is a turning operation or a moving operation on the operation element 10. Accordingly, it is possible to clearly distinguish the first driving operation and the second driving operation and avoid confusion between the two.

The first driving operation includes a stroke operation in the circumferential direction on the outer circumferential part 33C of the ring 33 by the hand of the occupant X. When the hand of the occupant X strokes the outer circumferential part 33C of the ring 33 in the circumferential direction, the capacitance of the third capacitive sensors 37 arranged in the circumferential direction changes sequentially. The signal processing unit 14 detects the stroke operation on the ring 33 by the occupant X based on the signals from the third capacitive sensors 37. Also, the signal processing unit 14 detects the direction and the length (stroke length) of the stroke operation based on the signals from the third capacitive sensors 37. The travel control unit 12 may control the steering device 4 according to the direction and the length of the stroke operation detected by the signal processing unit 14, thereby moving (offsetting) the vehicle 2 in the vehicle width direction, changing the lanes, and turning the vehicle 2 right or left.

Further, the first driving operation includes the contact operation on the facing part 33A or the back part 33B of the ring 33 by the occupant X. The contact operation includes, for example, a single tap operation, a double tap operation, and a long press operation. When the hand of the occupant X performs the contact operation on the facing part 33A or the back part 33B of the ring 33, the capacitance of the first capacitive sensor 35 or the second capacitive sensor 36 changes. The signal processing unit 14 determines the contact duration and the contact number of the hand of the occupant X based on the detection signal from the first capacitive sensor 35 or the second capacitive sensor 36, thereby determining whether the contact operation is either of a single tap operation, a double tap operation, and a long press operation.

For example, the travel control unit 12 executes the acceleration control in response to the operation on the facing part 33A, and executes the deceleration control in response to the operation on the back part 33B. The acceleration control includes the control to increase the target speed of the vehicle 2 by a predetermined value from the current value, the control to decrease the target vehicle-to-vehicle distance (namely, the distance between the vehicle 2 (namely, the own vehicle) and the preceding vehicle traveling in front of the vehicle 2) by a predetermined value from the current value, and the control to start the movement of the vehicle 2 from a state where the vehicle 2 is stopped. The deceleration control includes the control to decrease the target speed of the vehicle 2 by a predetermined value from the current value, the control to increase the target vehicle-to-vehicle distance by a predetermined value from the current value, and the control to stop the vehicle 2 from a state where the vehicle 2 is traveling at low speed. The travel control unit 12 may change the control to execute or the changing amount of the target speed of the vehicle 2 according to the mode of the operation on the facing part 33A or the back part 33B. For example, the travel control unit 12 may make the changing amount of the target speed of the vehicle 2 in response to a double tap operation larger than that of the target speed of the vehicle 2 in response to a single tap operation. Also, the travel control unit 12 may keep on increasing or decreasing the target speed of the vehicle 2 while a long press operation is being performed on the facing part 33A or the back part 33B.

The second driving operation includes the turning operation on the operation element 10 around the turning axis A and the moving operation (push/pull operation) on the operation element 10 along the turning axis A. When the occupant X performs the turning operation on the operation element 10, the turning angle sensor 38 detects the turning angle of the operation element 10 with respect to the vehicle body 15. The signal processing unit 14 acquires the turning angle of the operation element 10 based on the detection signal from the turning angle sensor 38, and the travel control unit 12 controls the steering device 4 according to the acquired turning angle, thereby steering the wheels 3 of the vehicle 2.

When the occupant X performs the moving operation on the operation element 10 to the front side (namely, when the occupant X pushes the operation element 10), the force sensor 39 detects the load applied to the operation element 10 to the front side. The signal processing unit 14 acquires the load applied to the operation element 10 and the direction of the load based on the detection signal from the force sensor 39, and the travel control unit 12 controls the drive device 5 according to the acquired load and the acquired direction of the load, thereby accelerating the vehicle 2. When the occupant X performs the moving operation on the operation element 10 to the rear side (namely, when the occupant X pulls the operation element 10), the force sensor 39 detects the load applied to the operation element 10 to the rear side. The signal processing unit 14 acquires the load applied to the operation element 10 and the direction of the load based on the detection signal from the force sensor 39, and the travel control unit 12 controls at least one of the drive device 5 and the brake device 6 according to the acquired load and the acquired direction of the load, thereby decelerating the vehicle 2. In another embodiment, the position sensor 29 may detect the moving operation on the operation element 10 by the occupant X, and the travel control unit 12 may execute the acceleration/deceleration control of the vehicle 2 based on the signal from the position sensor 29.

<The Driving Mode of the Vehicle 2>

The travel control unit 12 is configured to switch the driving mode of the vehicle 2 between the autonomous driving mode and the manual driving mode. In the autonomous driving mode, the travel control unit 12 automatically executes the steering operation and the acceleration/deceleration operation. In the manual driving mode, the occupant X manually performs the steering operation and the acceleration/deceleration operation.

In the autonomous driving mode, the travel control unit 12 independently creates a future trajectory of the vehicle 2, thereby controlling the steering device 4, the drive device 5, and the brake device 6. However, even in the autonomous driving mode, the travel control unit 12 receives the first driving operation on the operation element 10 by the occupant X, thereby causing the control of the steering device 4, the drive device 5, and the brake device 6 to reflect the intention of the occupant X. That is, the first driving operation is an auxiliary driving operation in the autonomous driving mode.

In the manual driving mode, the travel control unit 12 controls the steering device 4, the drive device 5, and the brake device 6 according to the second driving operation on the operation element 10 by the occupant X. That is, the second driving operation is an independent driving operation in the manual driving mode. In another embodiment, in the manual driving mode, the travel control unit 12 may control the drive device 5 and the brake device 6 according to a pressing operation on an accelerator pedal or a brake pedal by the occupant X.

<The Position of the Operation Element 10>

With reference to FIG. 2, the operation element 10 is movable among a first position P1 as an allowance position, a second position P2 as an allowance position, and a third position P3 as a restriction position. The first position P1 is located on the left side (the first side in the lateral direction) with respect to the center of the vehicle 2 in the lateral direction, and the second position P2 is located on the right side (the second side in the lateral direction) with respect to the center of the vehicle 2 in the lateral direction. That is, the first position P1 and the second position P2 are offset from each other in the lateral direction and separated from each other. The third position P3 is located at the center of the vehicle 2 in the lateral direction. The third position P3 is located between the first position P1 and the second position P2 in the lateral direction (more specifically, located in the middle of the first position P1 and the second position P2 in the lateral direction), and is offset from the first position P1 and the second position P2 in the lateral direction. The third position P3 is located more forward than the first position P1 and the second position P2 in the fore and aft direction. Accordingly, when the occupant X does not operate the operation element 10 (for example, when the autonomous driving mode is executed or when the occupant X gets on or off the vehicle 2), the operation element 10 is moved to the third position P3, so that the operation element 10 and the occupant X can be separated from each other. Accordingly, it is possible to prevent the operation element 10 from oppressing the occupant X.

In a state where the operation element 10 is located in the first position P1 or the second position P2, the vehicle 2 can travel in the autonomous driving mode and the manual driving mode. More specifically, in a state where the operation element 10 is located in the first position P1 or the second position P2, the travel control unit 12 switches the driving mode of the vehicle 2 between the manual driving mode and the autonomous driving mode according to an operation on a mode change switch 51 (see FIG. 1) by the occupant X. In a state where the operation element 10 is located in the third position P3, the vehicle 2 can travel only in the autonomous driving mode, and the manual driving mode cannot be selected. In a state where the operation element 10 is located between the first position P1 and the third position P3 or between the second position P2 and the third position P3, the vehicle 2 can travel only in the autonomous driving mode, and the manual driving mode cannot be selected.

In a state where the operation element 10 is located in the first position P1 or the second position P2, the operation element 10 can receive both the first driving operation and the second driving operation. More specifically, in a state where the operation element 10 is located in the first position P1 or the second position P2 and the driving mode of the vehicle 2 is set to the autonomous driving mode, the operation element 10 can receive the first driving operation. On the other hand, in a state where the operation element 10 is located in the first position P1 or the second position P2 and the driving mode of the vehicle 2 is set to the manual driving mode, the operation element 10 can receive the second driving operation.

In a state where the operation element 10 is located in the third position P3, between the first position P1 and the third position P3, or between the second position P2 and the third position P3, the driving mode of the vehicle 2 is set to the autonomous driving mode, and the operation element 10 can receive the first driving operation and cannot receive the second driving operation. Thus, in the third position P3 where the operation element 10 and the occupant X are separated from each other, it is possible to prevent the execution of the second driving operation, which makes the movable amount of the operation element 10 relatively large. Accordingly, it is possible to prevent an erroneous operation on the operation element 10 located in the third position P3.

<The Control of the Steering Device 4>

As described above, the operation element 10 and the steering device 4 are mechanically separated from each other and form a drive-by-wire (steer-by-wire) steering system. Accordingly, the travel control unit 12 can freely change a relationship between the turning angle of the operation element 10 and the steering angle δ of the wheels 3. Namely, the travel control unit 12 can steer the wheels 3 (the vehicle 2) relatively with respect to the turning angle of the operation element 10.

When the operation element 10 turns with respect to the base 24 (the vehicle body 15) in a state where the travel control unit 12 selects the manual driving mode, the turning angle sensor 38 (an example of a movement sensor) detects the turning angle of the operation element 10. The travel control unit 12 controls the steering device 4 based on a signal from the turning angle sensor 38, and thus changes the steering angle δ of the wheels 3.

In a state where the travel control unit 12 selects the autonomous driving mode, the travel control unit 12 controls the steering device 4 based on a travel trajectory of the vehicle 2 generated by the travel control unit 12 itself, and changes the steering angle δ of the wheels 3. Namely, the travel control unit 12 controls the steering device 4 regardless of the signal from the turning angle sensor 38.

<The Indicator 71>

With reference to FIGS. 1 and 5, the operation element 10 includes an indicator 71. The interface control unit 41 (an example of an indicator control unit) of the control device 11 is configured to execute lighting control of the indicator 71. The indicator 71 includes plural first light sources 71A and plural second light sources 71B.

Each first light source 71A of the indicator 71 consists of, for example, an electroluminescence element (EL element)

such as an LED. The first light sources 71A are, for example, arranged annularly along the ring 33. In another embodiment, one first light source 71A may be arranged annularly along the ring 33. The first light sources 71A are configured to turn on based on a signal from the interface control unit 41 so as to illuminate the ring 33.

Each second light source 71B of the indicator 71 consists of, for example, an electroluminescence element (EL element) such as an LED. The second light sources 71B are, for example, arranged annularly along the hub 31. In another embodiment, the second light sources 71B may be arranged annularly along the disk 32. Alternatively, one second light source 71B may be arranged annularly along the hub 31 or the disk 32. The second light sources 71B are configured to turn on based on the signal from the interface control unit 41 so as to illuminate at least one of the hub 31 and the disk 32.

<The Control Device 11>

With reference to FIG. 1, the control device 11 includes a travel information acquiring unit 72 configured to acquire a prospective trajectory of the vehicle 2 from the travel control unit 12 as travel information of the vehicle 2. For example, the travel control unit 12 may create the prospective trajectory of the vehicle 2 based on the position of the vehicle 2 (namely, the own vehicle) and the map information acquired by the navigation device 49 and/or based on the image captured by the camera 47.

The control device 11 includes a grip area setting unit 73 configured to set at least one recommended grip area P (which will be described later) of the operation element 10 to be gripped by the occupant X, based on the prospective trajectory of the vehicle 2 acquired by the travel information acquiring unit 72.

The control device 11 includes an approach determining unit 74 configured to determine whether at least one arm of the occupant X has approached the operation element 10 based on the image of the arm of the occupant X and the operation element 10 captured by the image capturing device 26. For example, in a case where a distance in the fore and aft direction from the arm of the occupant X to the operation element 10 is more than a prescribed reference distance, the approach determining unit 74 determines that the arm of the occupant X has not approached the operation element 10. On the other hand, in a case where the distance in the fore and aft direction from the arm of the occupant X to the operation element 10 becomes equal to or less than the prescribed reference distance, the approach determining unit 74 determines that the arm of the occupant X has approached the operation element 10.

The control device 11 includes a transmission ratio setting unit 75 configured to estimate a contact area S of the operation element 10 and the occupant X based on the contact state of the occupant X against the operation element 10 (an example of a driving state of the occupant X) detected by the first to third capacitive sensors 35 to 37 (an example of an occupant detection unit). For example, as the number of the third capacitive sensors 37 that have detected the contact of the occupant X against the operation element 10 decreases, the contact area S estimated by the transmission ratio setting unit 75 decreases. The transmission ratio setting unit 75 is configured to set a transmission ratio R (a ratio of a control amount of the steering device 4 to an operation amount of the operation element 10) based on the estimated contact area S. For example, as the contact area S decreases, the transmission ratio R set by the transmission ratio setting unit 75 decreases. Thereby, the transmission ratio R can be appropriately set based on the contact area S.

In another embodiment, the transmission ratio setting unit 75 may estimate a direction of a sight-line of the occupant X based on the image of the occupant X (an example of the driving state of the occupant X) captured by the image capturing device 26 (an example of the occupant detection unit), and thus set the transmission ratio R based on the estimated direction of the sight-line of the occupant X. For example, in a case where the direction of the sight-line of the occupant X does not match an operation direction of the operation element 10, the transmission ratio setting unit 75 sets the transmission ratio R lower as compared with a case where the direction of the sight-line of the occupant X matches the operation direction of the operation element 10. Alternatively, in a case where the direction of the sight-line of the occupant X is not directed forward, the transmission ratio setting unit 75 sets the transmission ratio R lower as compared with a case where the direction of the sight-line of the occupant X is directed forward. Thereby, the transmission ratio R can be appropriately set based on the direction of the sight-line of the occupant X.

In still another embodiment, the transmission ratio setting unit 75 may acquire a lateral offset amount of the occupant X with respect to the operation element 10 based on the image of the occupant X (an example of the driving state of the occupant X) captured by the image capturing device 26 (an example of the occupant detection unit), and thus set the transmission ratio R based on the above offset amount. For example, as the lateral offset amount of the occupant X with respect to the operation element 10 increases, the transmission ratio R set by the transmission ratio setting unit 75 decreases. Thereby, the transmission ratio R can be appropriately set based on the lateral offset amount of the occupant X with respect to the operation element 10.

<The First Example of the Lighting Control of the Indicator 71>

Next, the first example of the lighting control of the indicator 71 will be described with reference to FIGS. 8A-8C. As described above, the indicator 71 includes the plural first light sources 71A and the plural second light sources 71B. In the following, only the first light sources 71A will be described, and the description of the second light sources 71B will be omitted. The hatching attached to each first light source 71A in FIGS. 8B and 8C indicates that this first light source 71A stays on (or turns on). Further, the many dots attached to the ring 33 in FIGS. 8B and 8C indicate the at least one recommended grip area P.

In a state where the travel control unit 12 selects the manual driving mode, the interface control unit 41 selects a first control mode of the indicator 71. In this first control mode of the indicator 71, the occupant X has already gripped the operation element 10, and thus there is little need to clearly indicate the recommended grip area P to the occupant X. Accordingly, the interface control unit 41 causes all the first light sources 71A to stay off (see FIG. 8A). Thereby, it is possible to prevent the indicator 71 from turning on unnecessarily.

Further, in a state where the travel control unit 12 selects the autonomous driving mode, the interface control unit 41 selects a second control mode of the indicator 71. In this second control mode of the indicator 71, in a case where the approach determining unit 74 determines that the arm of the occupant X has not approached the operation element 10, there is little need to clearly indicate the recommended grip area P to the occupant X. Accordingly, the interface control unit 41 causes all the first light sources 71A to stay off (see FIG. 8A). Thereby, it is possible to prevent the indicator 71 from turning on unnecessarily.

On the other hand, in the second control mode of the indicator 71, in a case where the approach determining unit 74 determines that the arm of the occupant X has approached the operation element 10, there is much need to clearly indicate the recommended grip area P to the occupant X. Accordingly, as described in detail below, the interface control unit 41 turns on all or a part of the first light sources 71A so as to illuminate the recommended grip area P (see FIGS. 8B and 8C). In this way, all or a part of the first light sources 71A turn on when the approach determining unit 74 determines that the arm of the occupant X has approached the operation element 10, so that the occupant X can easily notice the recommended grip area P.

Figure 8B:
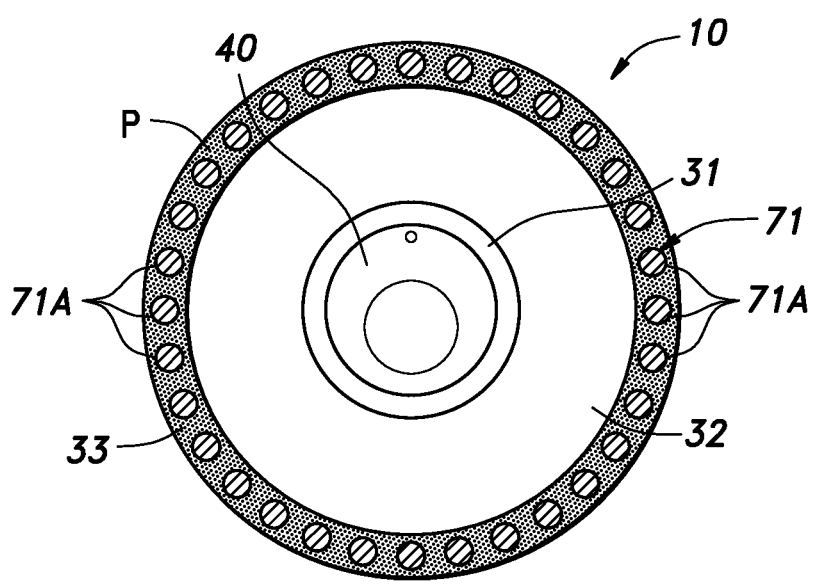

For example, in a case where the travel information acquiring unit 72 acquires a straight trajectory as the prospective trajectory of the vehicle 2, the grip area setting unit 73 sets the recommended grip area P in a whole area of the ring 33 in a circumferential direction (see FIG. 8B). Thus, the interface control unit 41 turns on all the first light sources 71A so as to illuminate the recommended grip area P. Accordingly, it is possible to clearly indicate that the occupant X can grip any area of the ring 33.

On the other hand, in a case where the travel information acquiring unit 72 acquires a turning trajectory as the prospective trajectory of the vehicle 2, the grip area setting unit 73 sets the recommended grip areas P in a part of the ring 33 in the circumferential direction. For example, in a case where the travel information acquiring unit 72 acquires a turning trajectory to the left as the prospective trajectory of the vehicle 2, the grip area setting unit 73 sets the recommended grip areas P in an upper right part and a lower left part of the ring 33 (see FIG. 8C). Thus, the interface control unit 41 turns on a part of the first light sources 71A so as to illuminate the recommended grip areas P. Accordingly, in a case where the prospective trajectory of the vehicle 2 is the turning trajectory, it is possible to clearly indicate areas of the operation element 10 to be gripped by the occupant X.

In a case where the first to third capacitive sensors 35 to 37 do not detect that the recommended grip area P is gripped by the occupant X after the interface control unit 41 turns on all or a part of the first light sources 71A, the interface control unit 41 causes all or a part of the first light sources 71A to stay on for a prescribed period. Accordingly, the occupant X can be prompted to grip the recommended grip area P. On the other hand, in a case where the first to third capacitive sensors 35 to 37 detect that the recommended grip area P is gripped by the occupant X after the interface control unit 41 turns on all or a part of the first light sources 71A, the interface control unit 41 turns off all the first light sources 71A. Thereby, it is possible to prevent the indicator 71 from turning on unnecessarily.

As described above, in the first example of the lighting control of the indicator 71, the interface control unit 41 turns on the first light sources 71A so as to illuminate the at least one recommended grip area P in a state where the travel control unit 12 selects the autonomous driving mode (namely, in a state where the interface control unit 41 selects the second control mode). Accordingly, when the driving mode of the vehicle 2 shifts from the autonomous driving mode to the manual driving mode, the occupant X can easily find an area of the operation element 10 to be gripped, and thus can smoothly start the driving operation on the operation element 10. Further, the interface control unit 41 changes the control mode of the indicator 71 according to the driving mode selected by the travel control unit 12, and thus the indicator 71 can be shifted to a lighting state suitable for the driving mode.

Also, in the first example of the lighting control of the indicator 71, the travel information acquiring unit 72 acquires a prospective trajectory of the vehicle 2 as the travel information of the vehicle 2, and the grip area setting unit 73 sets the at least one recommended grip area P based on the prospective trajectory of the vehicle 2 acquired by the travel information acquiring unit 72. Accordingly, the recommended grip area P can be set according to the prospective trajectory of the vehicle 2, so that the occupant X can start the driving operation on the operation element 10 more smoothly.

<The Second Example of the Lighting Control of the Indicator 71>

Next, the second example of the lighting control of the indicator 71 will be described with reference to FIGS. 9, 10A and 10B. Descriptions of the second example of the lighting control that may duplicate descriptions of the first example thereof will be appropriately omitted.

Figure 9:
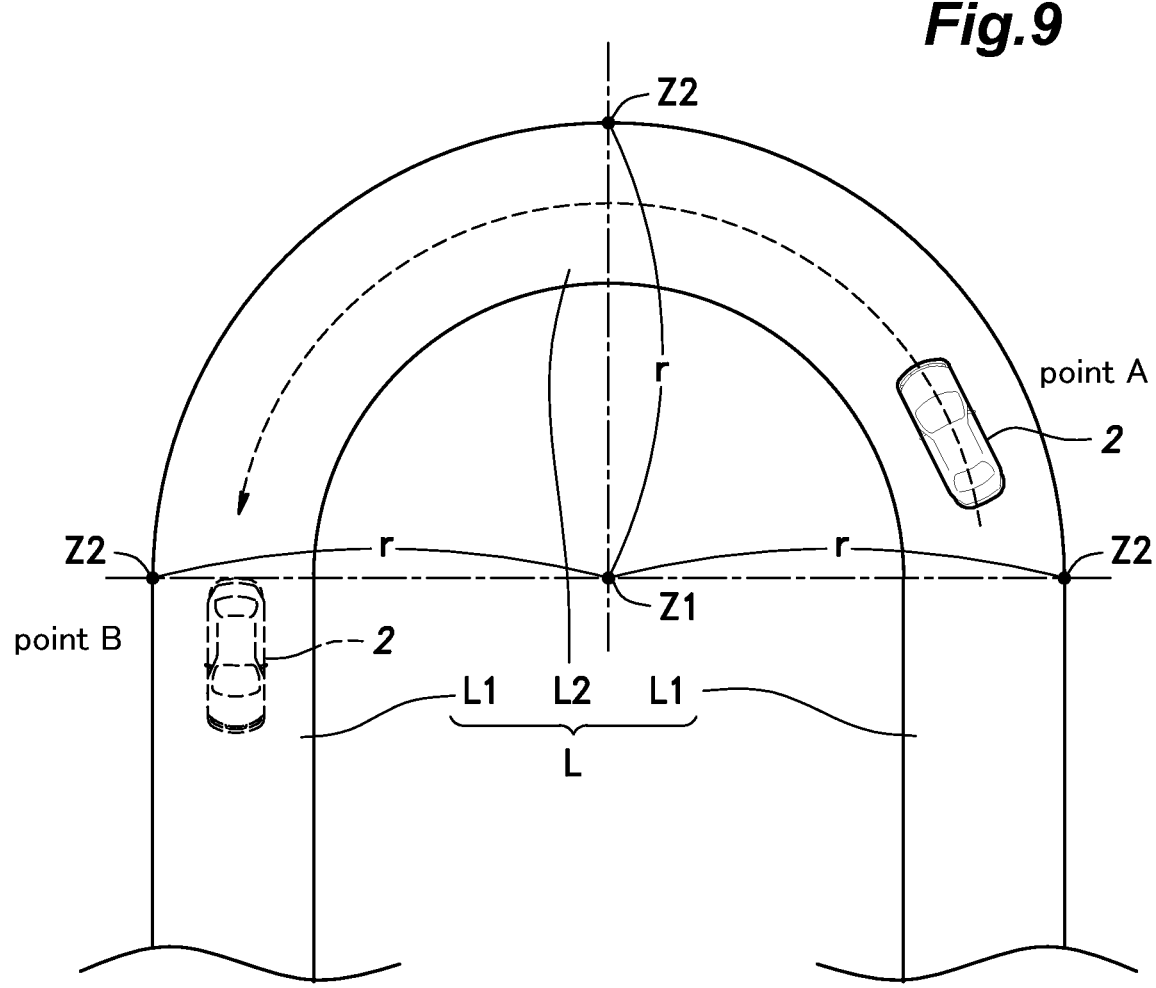
FIG. 9 is a plan view showing a travel path of the vehicle in a second example of the lighting control of the indicator.

FIG. 9 shows a travel path L where the vehicle 2 travels. The travel path L includes two straight sections L1 and one curved section L2 provided between the two straight sections L1. It is assumed that the vehicle 2 follows the travel path L along a direction indicated by a broken arrow.

When the vehicle 2 is traveling at a point A within the curved section L2 (namely, when the vehicle 2 is traveling on the turning trajectory), the travel information acquiring unit 72 acquires the turning trajectory as the travel trajectory of the vehicle 2 (an example of the travel information of the vehicle 2). In such a case, the grip area setting unit 73 first sets proper grip areas Q of the operation element 10 to be gripped by the occupant X at a point B (See FIG. 10A). The point B is a boundary point between the upcoming straight section L1 and the curved section L2 (namely, a point where the prospective trajectory of the vehicle 2 changes from the turning trajectory to the straight trajectory). For example, the grip area setting unit 73 sets the proper grip areas Q at vertical center areas of both lateral parts of the ring 33. In another embodiment, the grip area setting unit 73 may set the proper grip areas Q at upper areas of both lateral parts of the ring 33.

Subsequently, the grip area setting unit 73 acquires the radius of curvature r of the curved section L2 (for example, the distance from the center of curvature Z1 of the curved section L2 to the outer edges Z2 of the curved section L2) based on the map information from the navigation device 49, and thus acquires the curvature of the curved section L2 by calculating a reciprocal of the radius of curvature r. Next, the grip area setting unit 73 estimates a turning angle RA of the operation element 10 when the prospective trajectory of the vehicle 2 changes from the turning trajectory to the straight trajectory based on the transmission ratio R and the curvature of the curved section L2. For example, as the transmission ratio R decreases, the turning angle RA of the operation element 10 estimated by the grip area setting unit 73 increases. Further, as the curvature of the curved section L2 increases, the turning angle RA of the operation element 10 estimated by the grip area setting unit 73 increases.

Further, the grip area setting unit 73 estimates a turning direction RD of the operation element 10 when the prospective trajectory of the vehicle 2 changes from the turning trajectory to the straight trajectory based on a curved direction of the curved section L2. For example, in a case where the curved section L2 is curved to the left, the grip area setting unit 73 estimates that the turning direction RD of the operation element 10 is a clockwise direction when viewed from the occupant X. On the other hand, in a case where the curved section L2 is curved to the right, the grip area setting unit 73 estimates that the turning direction RD of the operation element 10 is a counterclockwise direction when viewed from the occupant X.

Next, the grip area setting unit 73 sets the recommended grip areas P based on the estimated turning angle RA and the estimated turning direction RD of the operation element 10 and the proper grip areas Q (see FIG. 10B). For example, the grip area setting unit 73 sets the recommended grip areas P at areas turned (or shifted) from the proper grip areas Q by the turning angle RA in a direction opposite to the turning direction RD. Accordingly, the recommended grip areas P can be set such that the occupant X grips the proper grip areas Q when the prospective trajectory of the vehicle 2 changes from the turning trajectory to the straight trajectory.

As described above, in the second example of the lighting control of the indicator 71, the grip area setting unit 73 sets the at least one recommended grip area P based on the travel trajectory of the vehicle 2 and the transmission ratio R. Accordingly, the recommended grip areas P can be set according to not only the travel trajectory of the vehicle 2 but also the transmission ratio R, so that the occupant X can start the driving operation on the operation element 10 more smoothly.

<The Third Example of the Lighting Control of the Indicator 71>

Next, the third example of the lighting control of the indicator 71 will be described with reference to FIG. 11. Descriptions of the third example of the lighting control that may duplicate descriptions of the first example thereof will be appropriately omitted.

In the third example of the lighting control of the indicator 71, the travel information acquiring unit 72 acquires a prospective deceleration of the vehicle 2 within a prescribed time (hereinafter simply referred to as "prospective deceleration") as the travel information of the vehicle 2 based on a signal from the acceleration sensor included in the vehicle sensor 45. In another embodiment, the travel information acquiring unit 72 may acquire a prospective acceleration of the vehicle 2 within a prescribed time as the travel information of the vehicle 2 based on a signal from the acceleration sensor included in the vehicle sensor 45.

Figure 11:
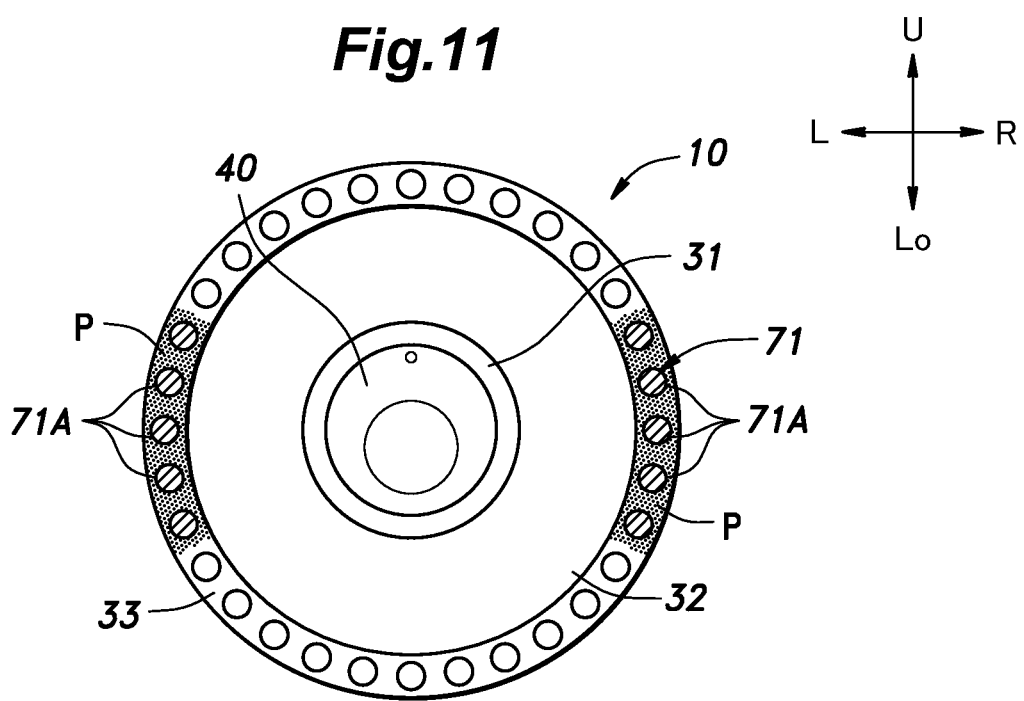
FIG. 11 is a rear view showing a third example of the lighting control of the indicator.

In a case where the travel information acquiring unit 72 acquires the prospective deceleration equal to or more than a prescribed threshold, the grip area setting unit 73 sets the recommended grip areas P at respective prescribed positions (for example, vertical center positions) of both lateral parts of the operation element 10 (see FIG. 11). The interface control unit 41 turns on a part of the first light sources 71A so as to illuminate the recommended grip area P.

As described above, in the third example of the lighting control of the indicator 71, in a case where the travel information acquiring unit 72 acquires the prospective deceleration equal to or more than the prescribed threshold, the grip area setting unit 73 sets the recommended grip areas P at respective prescribed positions of both lateral parts of the operation element 10. Accordingly, it is possible to prompt the occupant X to grip appropriate areas of the operation element 10 according to braking of the vehicle 2.

<The Fourth Example of the Lighting Control of the Indicator 71>

Next, the fourth example of the lighting control of the indicator 71 will be described with reference to FIGS. 12A and 12B. Descriptions of the fourth example of the lighting control that may duplicate descriptions of the first example thereof will be appropriately omitted.

In the fourth example of the lighting control of the indicator 71, the approach determining unit 74 identifies the number (one or two) and the position of the at least one arm of the occupant X that has approached the operation element 10 based on the image captured by the image capturing device 26. The grip area setting unit 73 sets the at least one recommended grip area P based on the number and the position of the arm of the occupant X identified by the approach determining unit 74.

For example, in a case where the approach determining unit 74 identifies one arm of the occupant X on a right side of the lateral center of the operation element 10, the grip area setting unit 73 sets only one recommended grip area P in a right side part of the ring 33 (see FIG. 12A). The interface control unit 41 turns on a part of the first light sources 71A so as to illuminate the recommended grip area P.

On the other hand, in a case where the approach determining unit 74 identifies two arms of the occupant X on both lateral sides of the lateral center of the operation element 10, the grip area setting unit 73 sets one recommended grip area P in a right side part of the ring 33 and the other recommended grip area P in a left side part thereof (see FIG. 12B). The interface control unit 41 turns on a part of the first light sources 71A so as to illuminate the recommended grip areas P.

As described above, in the fourth example of the lighting control of the indicator 71, the grip area setting unit 73 sets the at least one recommended grip area P based on the number and the position of the arm of the occupant X identified by the approach determining unit 74. Accordingly, the recommended grip area P is set according to the number and the position of the arm of the occupant X that has approached the operation element 10, so that the occupant X can more easily find an area of the operation element 10 to be gripped, and thus can more smoothly start the driving operation on the operation element 10.

<The Fifth Example of the Lighting Control of the Indicator 71>

Figure 13:
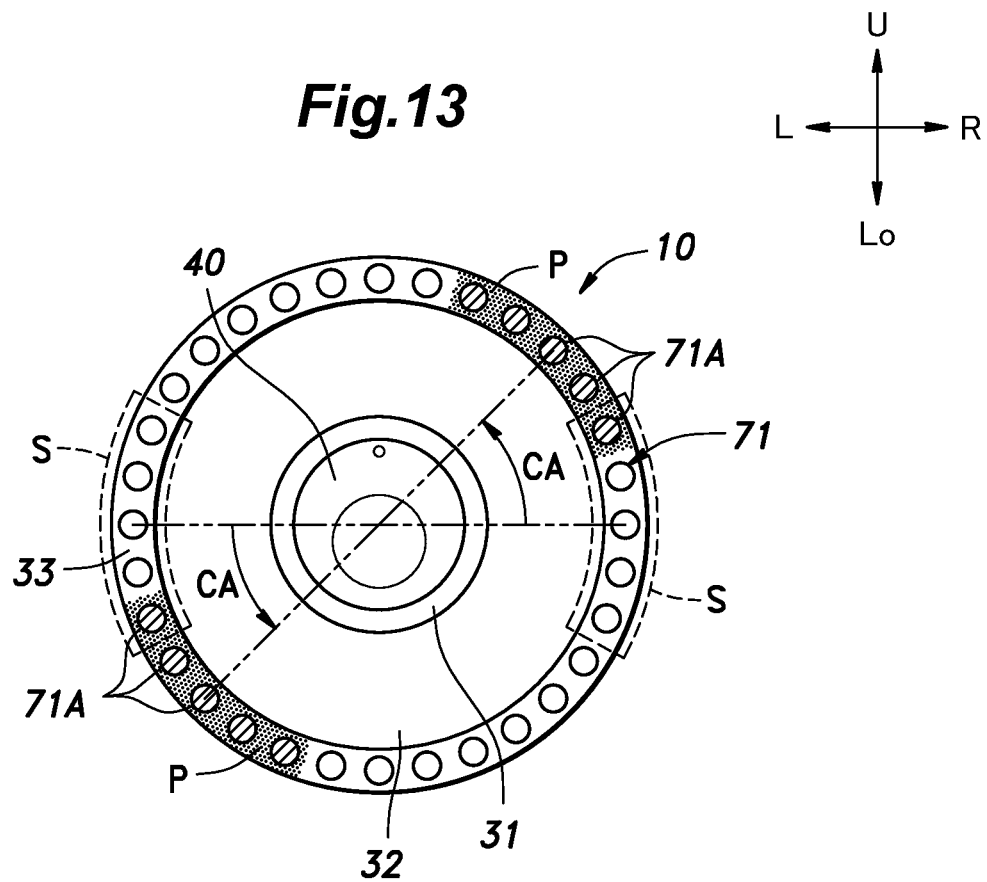
FIG. 13 is a rear view showing a fifth example of the lighting control of the indicator.

Next, the fifth example of the lighting control of the indicator 71 will be described with reference to FIG. 13. Descriptions of the fifth example of the lighting control that may duplicate descriptions of the first example thereof will be appropriately omitted.

In the fifth example of the lighting control of the indicator 71, the travel information acquiring unit 72 acquires the steering angle $\delta$ of the wheels 3 as the travel information of the vehicle 2 based on a signal from a steering angle sensor 84 (see FIG. 1).

The grip area setting unit 73 calculates a proper grip angle CA by multiplying the steering angle $\delta$ of the wheels 3 by the reciprocal of the transmission ratio R. For example, in a case where the steering angle $\delta$ of the wheels 3 is 6 degrees in a counterclockwise direction and the transmission ratio R is 0.2, the grip area setting unit 73 calculates the proper grip angle CA at 30 (=6×(1/0.2)) degrees in the counterclockwise direction (see FIG. 13).

Next, the grip area setting unit 73 sets the recommended grip areas P at positions turned (or shifted) from prescribed reference grip areas S (for example, the vertical center areas of both lateral parts of the ring 33) by the proper grip angle CA. For example, in a case where the proper grip angle CA is 30 degrees in the counterclockwise direction, the grip area setting unit 73 sets the recommended grip areas P at positions turned (or shifted) from the reference grip areas S by 30 degrees in the counterclockwise direction (see FIG. 13). The interface control unit 41 turns on a part of the first light sources 71A so as to illuminate the recommended grip areas P.

As mentioned above, in the fifth example of the lighting control of the indicator 71, the travel information acquiring unit 72 acquires the steering angle δ of the wheels 3 as the travel information of the vehicle 2, and the grip area setting unit 73 sets the recommended grip areas P based on the steering angle δ of the wheels 3. Accordingly, the recommended grip areas P can be set according to the steering angle δ of the wheels 3, so that the occupant X can start the driving operation on the operation element 10 more smoothly.

<Other Modifications>

In the first to fifth examples of the lighting control of the indicator 71, the at least one recommended grip area P is illuminated by using only the first light sources 71A. On the other hand, in another embodiment, the recommended grip area P may be illuminated by using both the first light sources 71A and the second light sources 71B. In still another embodiment, the display 40 may display the recommended grip area P while the first light sources 71A are illuminating the recommended grip area P. By displaying the recommended grip area P by the display 40 in this way, it is possible to display a complicated movement of the arms of the occupant X (for example, a movement to cross the arms of the occupant X).

Concrete embodiments of the present invention have been described in the foregoing, but the present invention should not be limited by the foregoing embodiments and various modifications and alterations are possible within the scope of the present invention.

The invention claimed is:

1. A vehicle control system comprising:
   a steering device configured to change a steering angle of a wheel;
   an operation element provided movably with respect to a vehicle body and configured to receive a driving operation by an occupant;
   an occupant detection unit configured to detect contact of the occupant against the operation element;
   a transmission ratio setting unit configured to estimate a contact area of the operation element and the occupant based on a signal from the occupant detection unit, and to set a transmission ratio based on the estimated contact area, the transmission ratio being a ratio of a control amount of the steering device to an operation amount of the operation element;
   a movement sensor configured to detect a movement of the operation element;
   a travel control unit configured to select a manual driving mode to control the steering device based on a signal from the movement sensor or an autonomous driving mode to control the steering device regardless of the signal from the movement sensor;
   a travel information acquiring unit configured to acquire travel information of a vehicle;
   a grip area setting unit configured to set at least one recommended grip area of the operation element based on the travel information of the vehicle acquired by the travel information acquiring unit;
   an indicator configured to turn on so as to illuminate the recommended grip area set by the grip area setting unit; and
   an indicator control unit configured to change a control mode of the indicator according to a driving mode selected by the travel control unit,
   wherein the grip area setting unit is configured to set the recommended grip area based on the travel information of the vehicle and the transmission ratio.

2. The vehicle control system according to claim 1, wherein the travel information acquiring unit is configured to acquire a prospective trajectory of the vehicle as the travel information of the vehicle, and
   the grip area setting unit is configured to set the recommended grip area based on the prospective trajectory of the vehicle acquired by the travel information acquiring unit.

3. The vehicle control system according to claim 2, wherein the operation element includes an annular grip portion,
   the indicator includes plural light sources arranged annularly along the grip portion, and
   in a case where the prospective trajectory of the vehicle is a straight trajectory, the grip area setting unit sets the recommended grip area in a whole area of the grip portion in a circumferential direction, and all the plural light sources turn on.

4. The vehicle control system according to claim 2, wherein the operation element includes an annular grip portion,
   the indicator includes plural light sources arranged annularly along the grip portion, and
   in a case where the prospective trajectory of the vehicle is a turning trajectory, the grip area setting unit sets the recommended grip area in a part of the grip portion in a circumferential direction, and a part of the plural light sources turn on.

5. The vehicle control system according to claim 2, wherein when the vehicle is traveling on a turning trajectory, the grip area setting unit sets at least one proper grip area of the operation element at a point where the prospective trajectory of the vehicle changes from the turning trajectory to a straight trajectory, and sets the recommended grip area based on the proper grip area.

6. The vehicle control system according to claim 1, wherein the at least one recommended grip area comprises plural recommended grip areas,
   the travel information acquiring unit is configured to acquire a prospective deceleration of the vehicle within a prescribed time as the travel information of the vehicle, and
   in a case where the travel information acquiring unit acquires the prospective deceleration equal to or more than a prescribed threshold, the grip area setting unit sets the plural recommended grip areas at respective prescribed positions of both lateral parts of the operation element.

7. The vehicle control system according to claim 1, wherein the travel information acquiring unit is configured to acquire the steering angle of the wheel as the travel information of the vehicle, and
   the grip area setting unit is configured to set the recommended grip area based on the steering angle of the wheel acquired by the travel information acquiring unit.

8. The vehicle control system according to claim 1, wherein the occupant detection unit includes an image capturing device configured to capture an image of the occupant, and
   the transmission ratio setting unit is configured to estimate a direction of a sight-line of the occupant based on the image of the occupant captured by the image capturing device and to set the transmission ratio based on the estimated direction of the sight-line.

9. The vehicle control system according to claim 1, further comprising:

an image capturing device configured to capture an image of at least one arm of the occupant and the operation element; and an approach determining unit configured to determine whether the arm of the occupant has approached the operation element based on the image captured by the image capturing device, wherein in a case where the approach determining unit determines that the arm of the occupant has approached the operation element, the indicator turns on.

10. The vehicle control system according to claim 1, further comprising a grip sensor configured to detect that the operation element is gripped by the occupant, wherein in a case where the grip sensor does not detect that the recommended grip area is gripped by the occupant after the indicator turns on, the indicator stays on for a prescribed period, and in a case where the grip sensor detects that the recommended grip area is gripped by the occupant after the indicator turns on, the indicator turns off.

11. The vehicle control system according to claim 1, wherein in a state where the travel control unit selects the manual driving mode, the indicator control unit selects a first control mode in which the indicator stays off, and in a state where the travel control unit selects the autonomous driving mode, the indicator control unit selects a second control mode in which the indicator at least temporarily stays on.

12. A vehicle control system comprising:

a steering device configured to change a steering angle of a wheel;

an operation element provided movably with respect to a vehicle body and configured to receive a driving operation by an occupant;

an image capturing device configured to capture an image of an arm of the occupant and the operation element;

an approach determining unit configured to determine whether the arm of the occupant has approached the operation element based on the image captured by the image capturing device, and to identify a position of the arm of the occupant that has approached the operation element based on the image captured by the image capturing device;

a movement sensor configured to detect a movement of the operation element;

a travel control unit configured to select a manual driving mode to control the steering device based on a signal from the movement sensor or an autonomous driving mode to control the steering device regardless of the signal from the movement sensor;

a travel information acquiring unit configured to acquire travel information of a vehicle;

a grip area setting unit configured to set at least one recommended grip area of the operation element based on the travel information of the vehicle acquired by the travel information acquiring unit;

an indicator configured to turn on so as to illuminate the recommended grip area set by the grip area setting unit; and an indicator control unit configured to change a control mode of the indicator according to a driving mode selected by the travel control unit, wherein the grip area setting unit is configured to set the recommended grip area based on the position of the arm of the occupant identified by the approach determining unit.

* * * * *